June 25, 1940.  J. JANDASEK  2,205,794

TURBINE TORQUE CONVERTER AND CLUTCH

Filed Feb. 23, 1935  9 Sheets-Sheet 1

INVENTOR.
Joseph Jandasek

June 25, 1940.  J. JANDASEK  2,205,794
TURBINE TORQUE CONVERTER AND CLUTCH
Filed Feb. 23, 1935  9 Sheets-Sheet 2
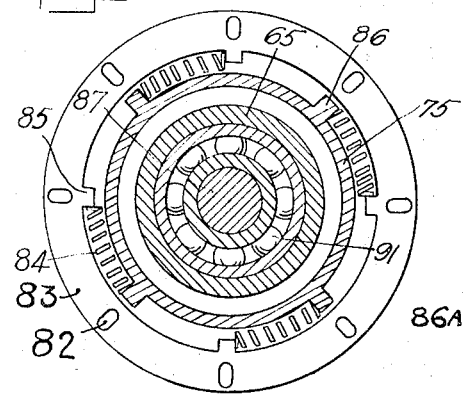
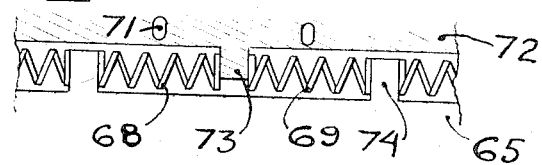
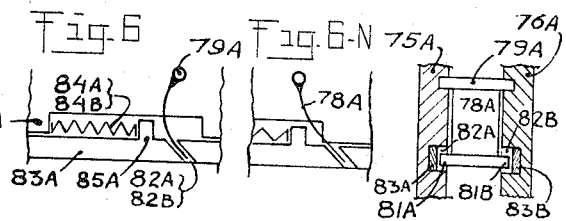
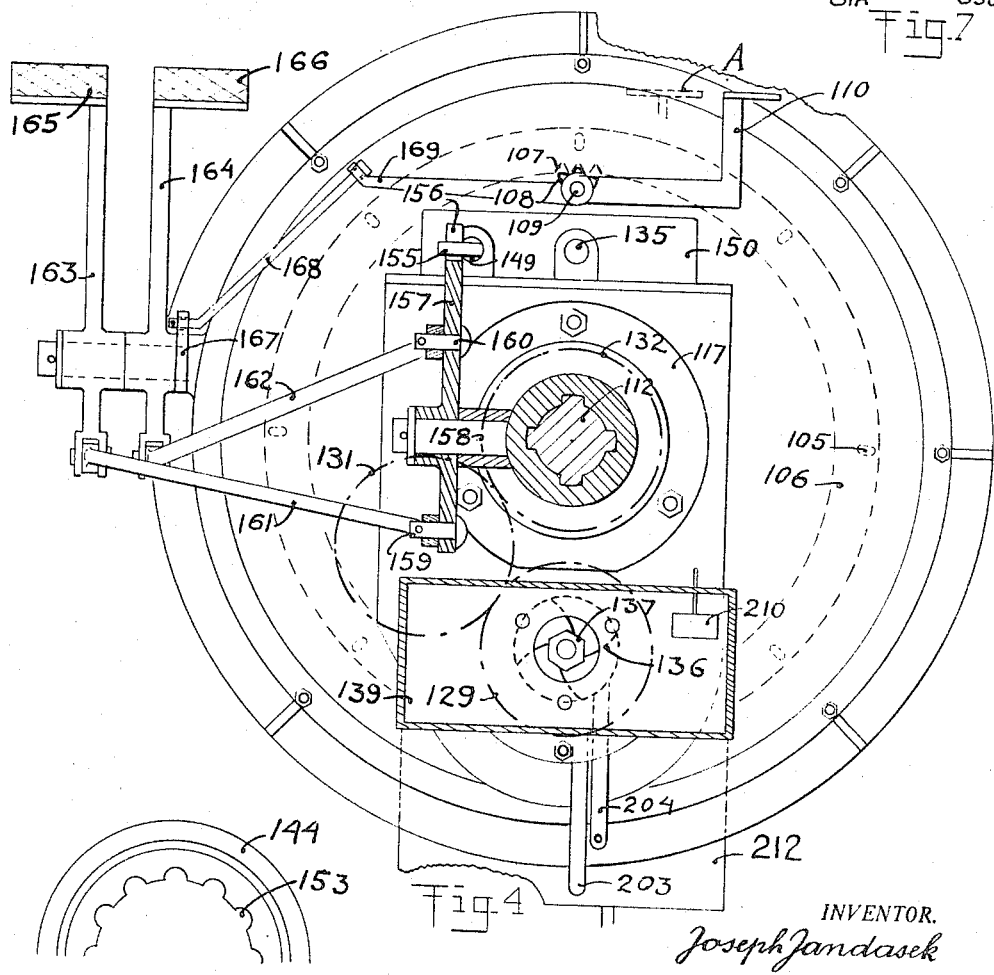
INVENTOR.
Joseph Jandasek June 25, 1940.   J. JANDASEK   2,205,794
TURBINE TORQUE CONVERTER AND CLUTCH
Filed Feb. 23, 1935   9 Sheets-Sheet 3
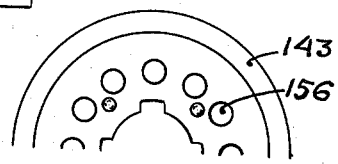
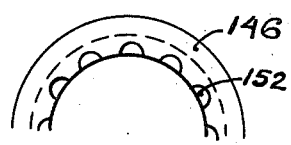
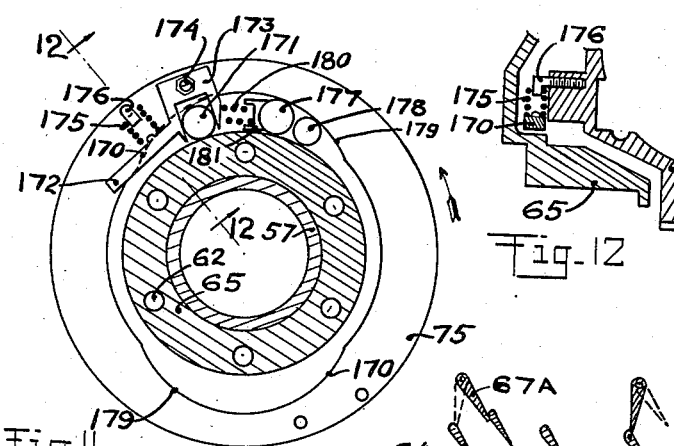
INVENTOR.
Joseph Jandasek June 25, 1940. J. JANDASEK 2,205,794
TURBINE TORQUE CONVERTER AND CLUTCH
Filed Feb. 23, 1935 9 Sheets-Sheet 4
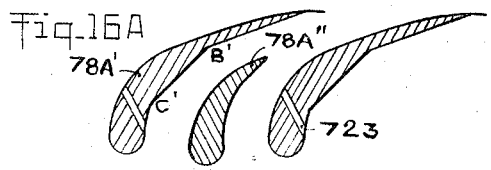
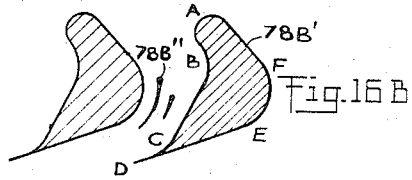
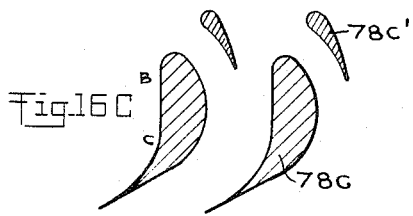
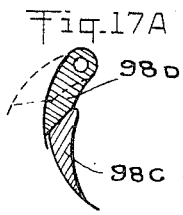
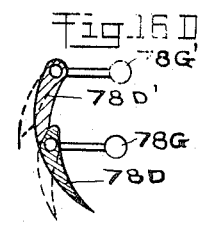
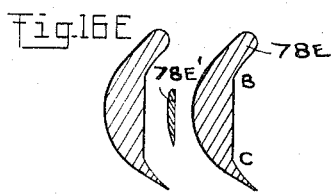
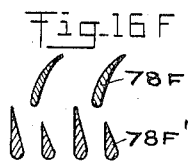
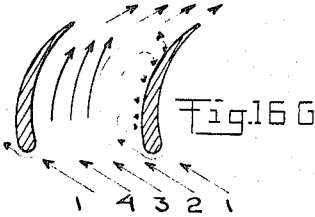
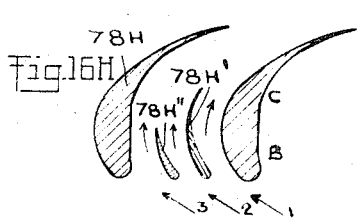
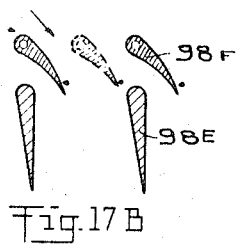
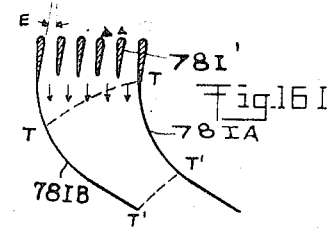
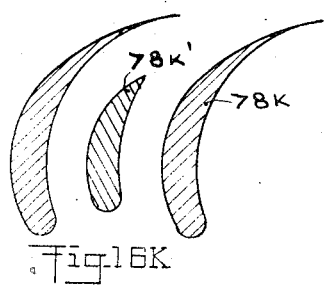
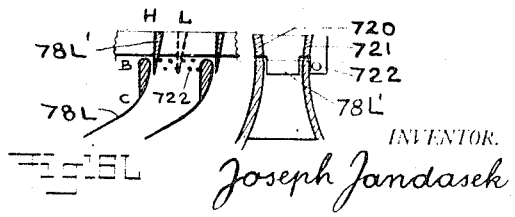
INVENTOR.
Joseph Jandasek

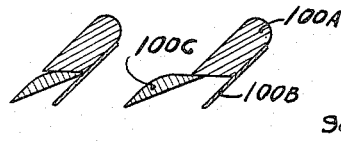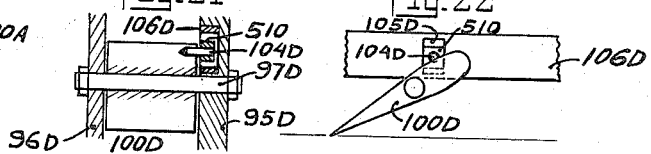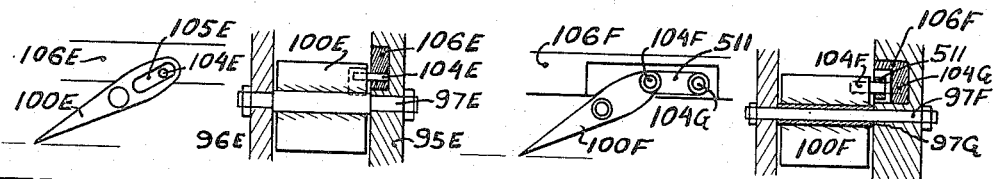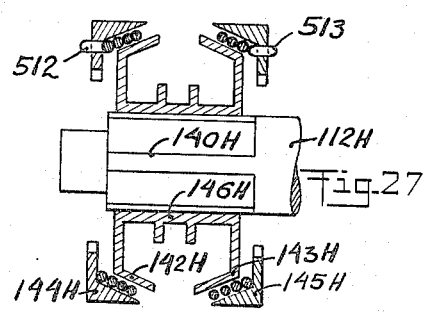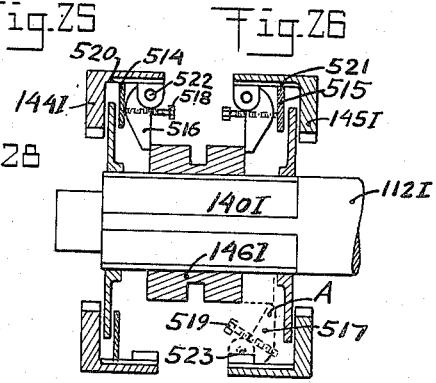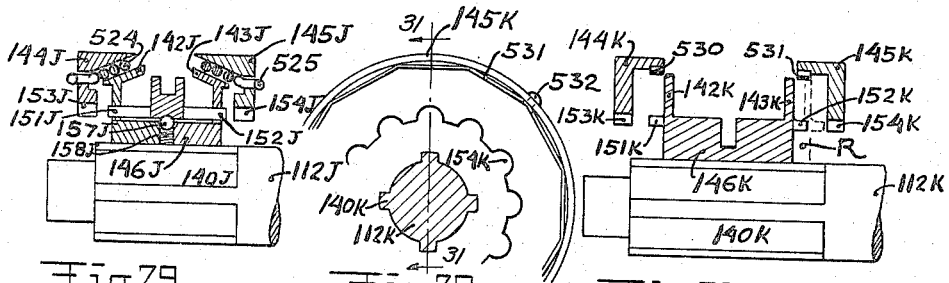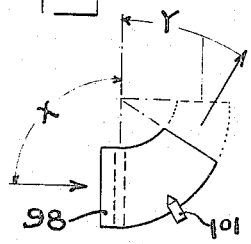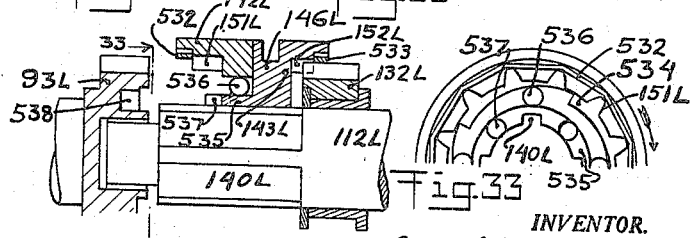

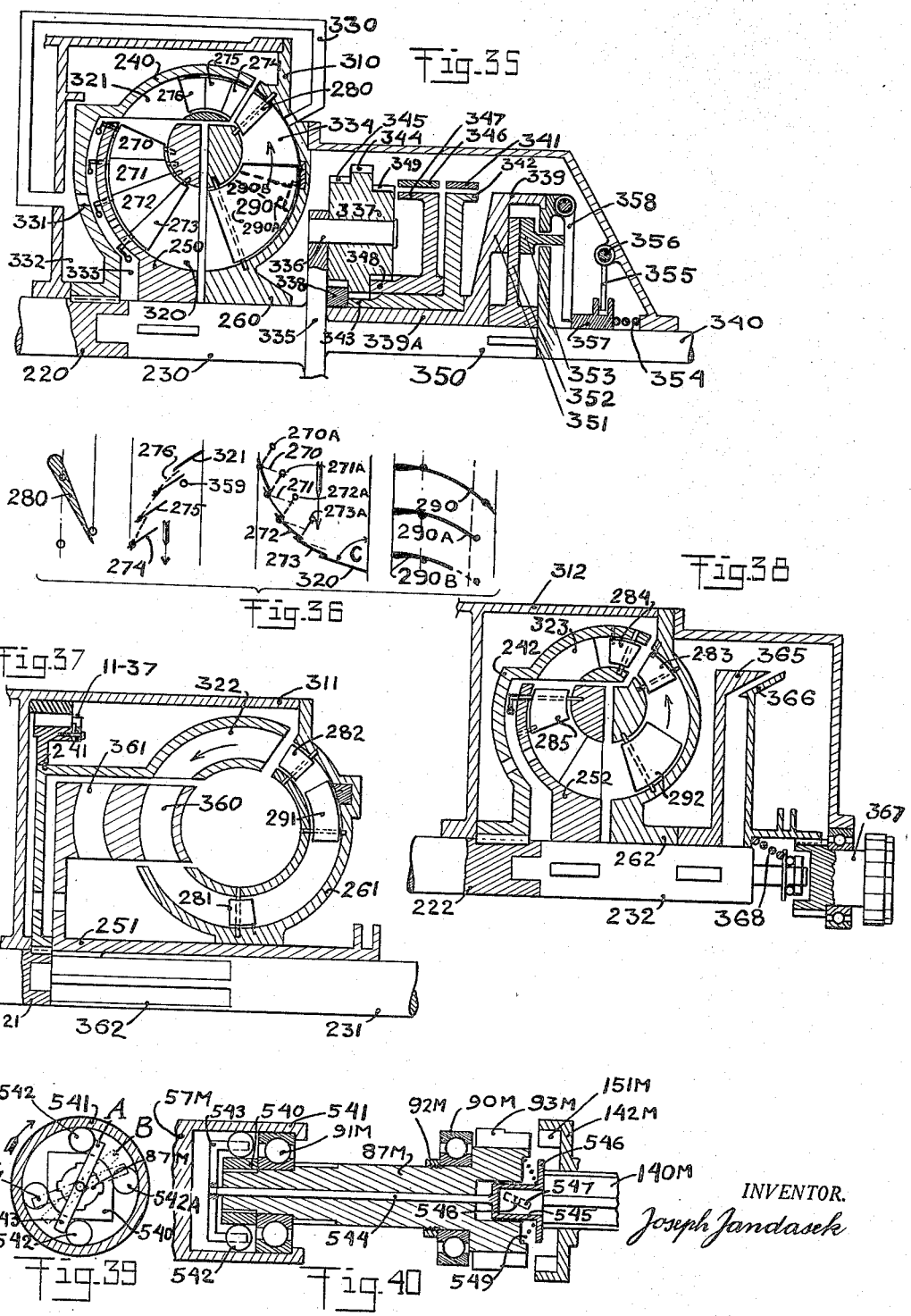

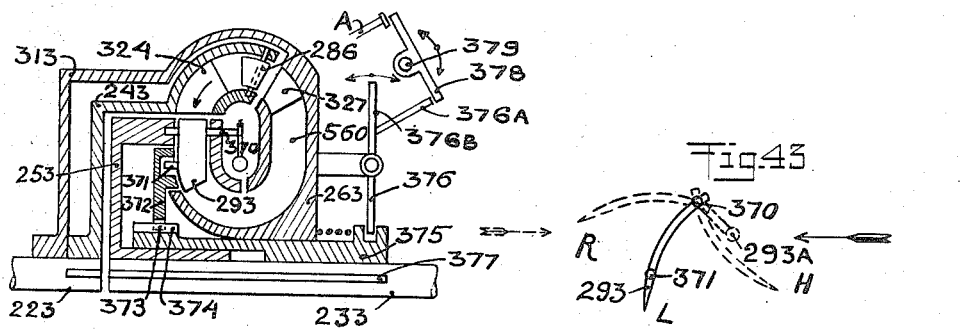
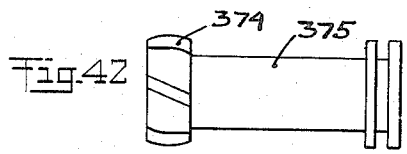
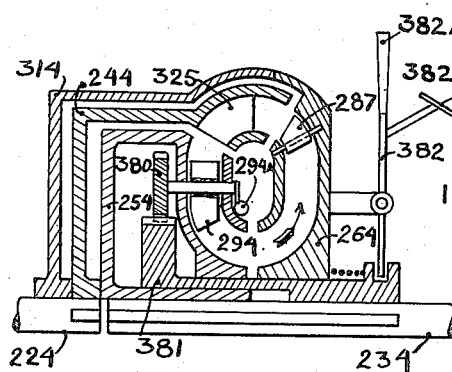
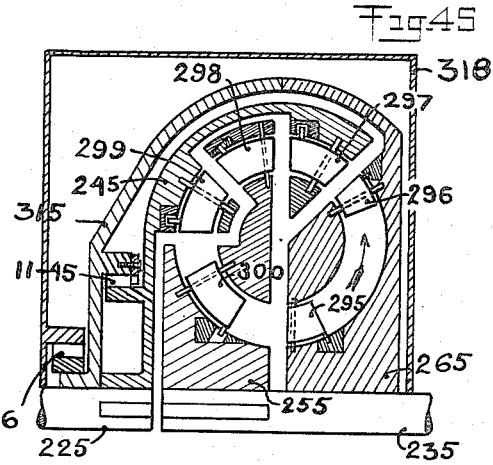
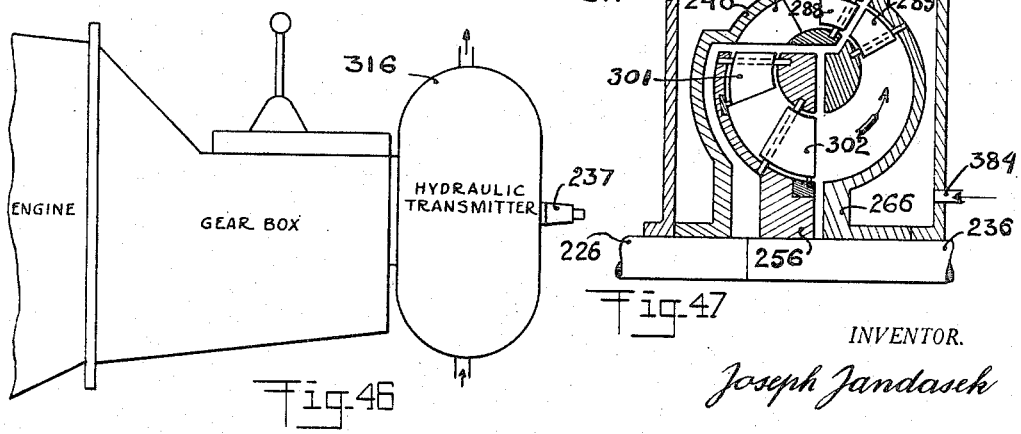

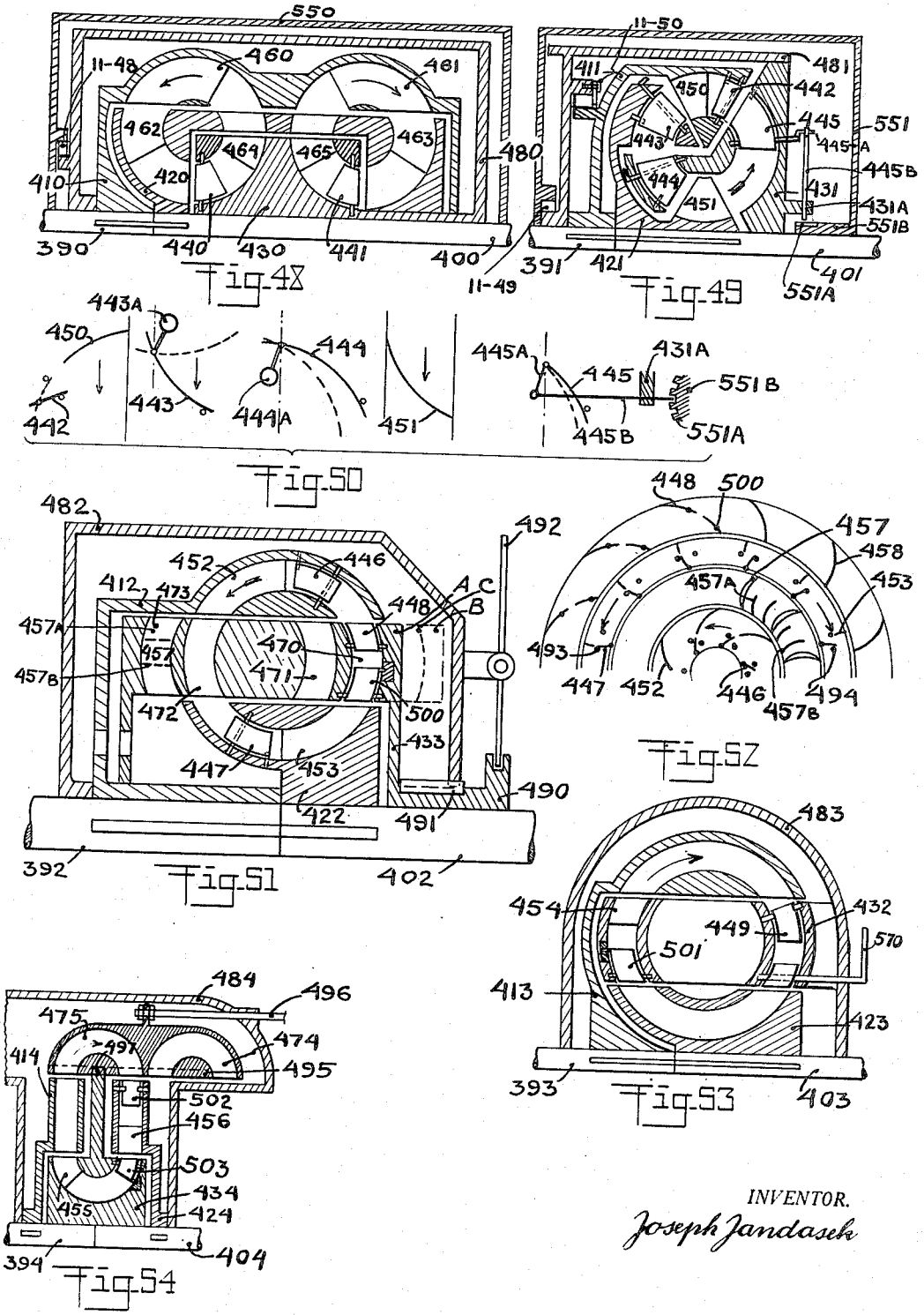

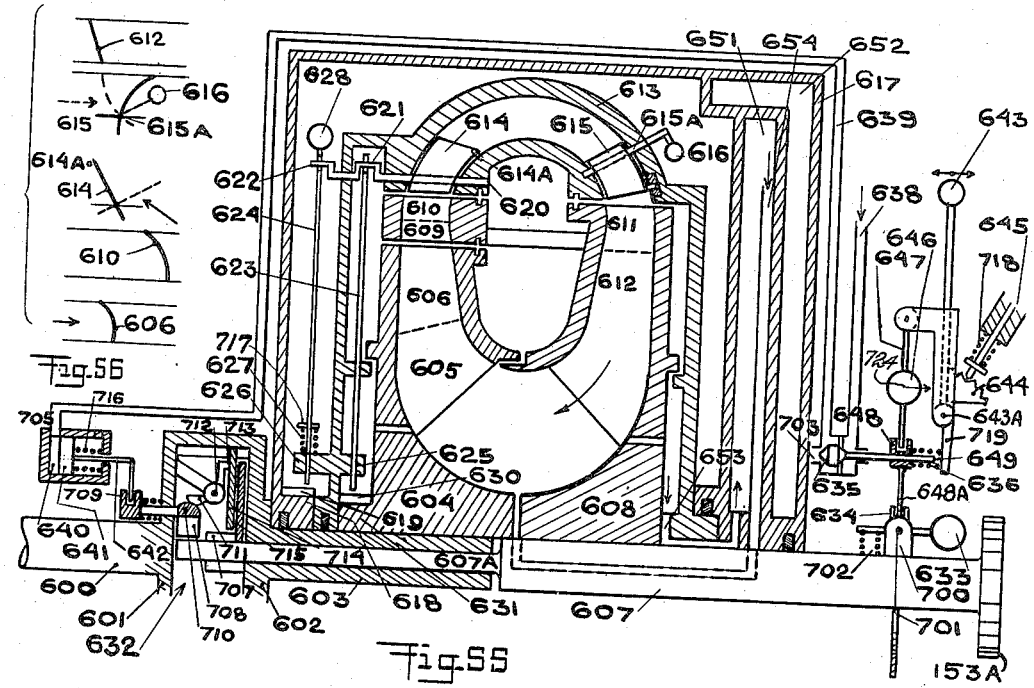
Fig.56  Fig.55
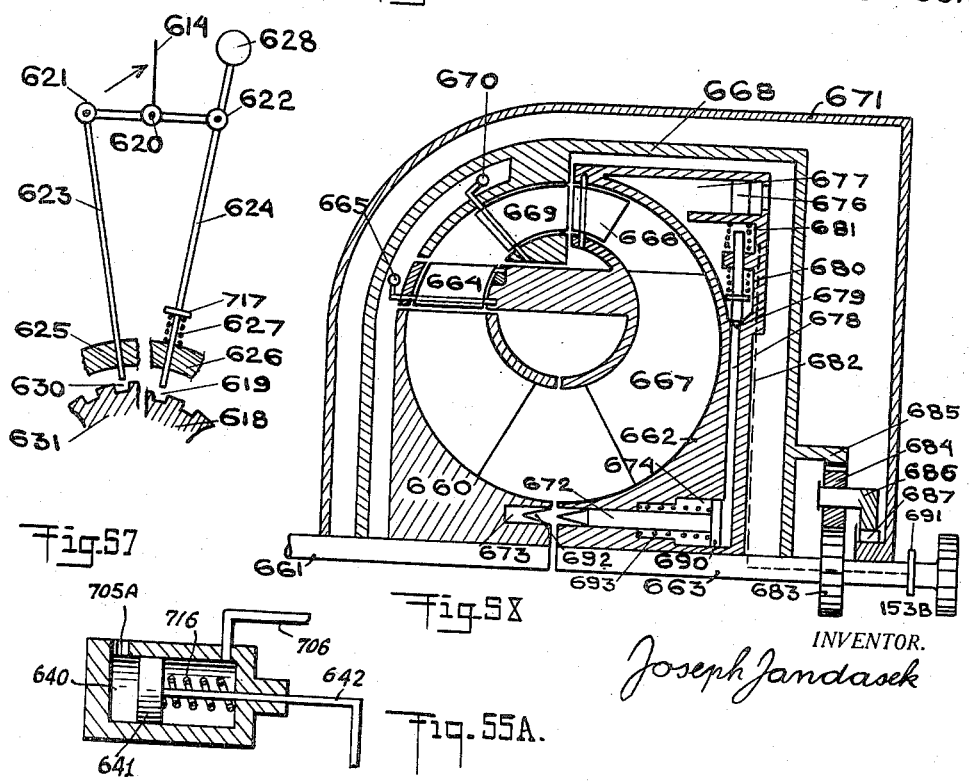
Fig.57  Fig.58
Fig.55A.
INVENTOR.
Joseph Jandasek Patented June 25, 1940

2,205,794

UNITED STATES PATENT OFFICE 2,205,794

TURBINE TORQUE CONVERTER AND CLUTCH

Joseph Jandasek, Cicero, Ill.

Application February 23, 1935, Serial No. 7,896

8 Claims. (Cl. 60—54)

This invention relates to a rotary apparatus for the transmission of power of the type comprising a passage for fluid including a pump impeller, turbine runners and a guide wheel.

The invention provides a high speed rotary mechanism for the transmission of power by means of a fluid at varying speeds such that from any applied driving speed and torque a driven speed and torque are obtained of which the torque varies automatically in accordance with the load and the speed varies inversely as the torque, the efficiency being high throughout the whole range of speeds, owing to infinite number of inclinations of the driving, driven and stationary vanes at all speeds and loads.

In order to increase the speed range I have used pivoted vanes for the blade wheels which vanes are automatically and continuously (not step by step) adjustable under the influence of the fluid. At the same time I have provided the blade wheels with a series of vanes; auxiliary vanes to rectify streamlines for the main vanes, to obtain orderly flow between the main vanes and to reduce the number of the main vanes. The best efficiency of the device is when gearing ratio is about 1:1.

The main object of my invention is to maintain the efficiency of the torque converter constantly high, especially at high speeds, by continuously adjustable vanes and by means of inserted auxiliary vanes.

Another object of my invention is to provide a new combination of the fluid torque converter with a reverse gear and to provide a quick and positive method for shifting into "forward" or "reverse" by inventing a shifting unit equipped with a synchronizing mechanism, so the runner shaft can be locked to the reverse gear shaft, at any conditions.

To attain these and other objects I have provided the impeller, the runner, and the guide wheel with spring vanes which are made to turn on their pivots and possess substantially correct entrance angles for every speed, the vanes being adjustably rotatable on their pivots by means of the fluid. I have used several sets of vanes of hydrofoil shape each set having its number, length, pitch, radial height, etc., correctly determined for the best efficiency and according to amount of deflection of fluid necessary in each particular set.

With these and other objects in view, my invention consists in combination, arrangement and construction herein described, claimed, and illustrated in the drawings, it being understood that many changes may be made in the parts and details of construction within the scope of the appended claims, without departing from the spirit of the invention.

Some of the many possible embodiments of the invention are illustrated in the drawings, in which:

Fig. 2 is a vertical section of the same converter taken on line 2—2 of Fig. 1.

Fig. 3 shows an arrangement of springs for controlling impeller vanes inclination.

Fig. 4 is a vertical section of the converter on line 4—4 of Fig. 1.

Fig. 5 is a vertical view of the upper half of an outer member of synchronizing clutch.

Fig. 6, 6N and 7 illustrate an alternative arrangement of flexible vanes for the runner.

Figure 1:
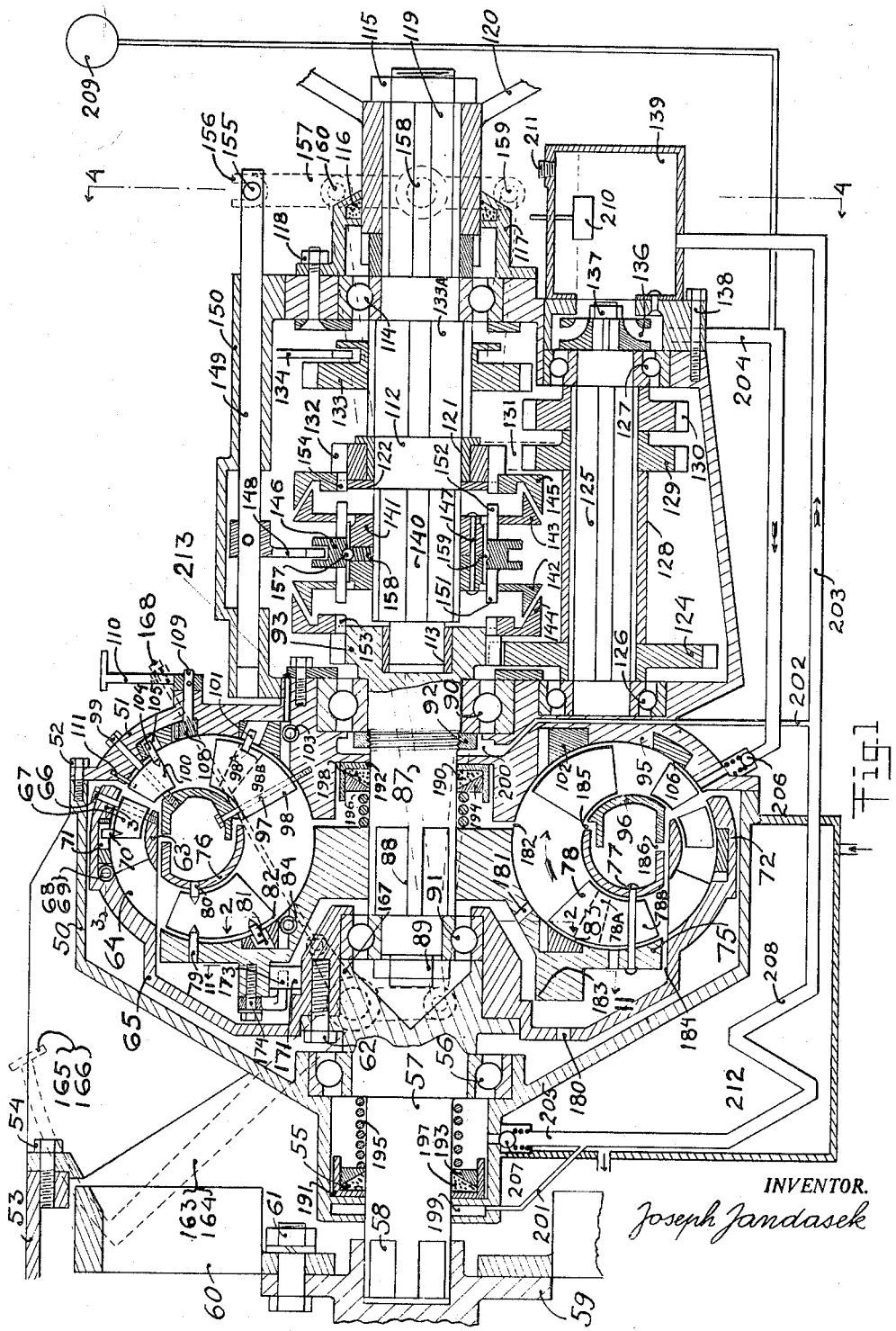
Fig. 1 is a longitudinal section of a turbine torque converter combined with a change speed gear transmission constructed in accordance with my invention.

Fig. 8 is a view of the main drive pinion; Fig. 9 is a view of an inner member of the synchronizing unit; Fig. 10 is a view of a shifting sleeve used in the gear transmission.

Fig. 11 is a vertical section of the converter taken on line 11—11 of Fig. 1; Fig. 12 is a section taken on line 12—12 of Fig. 11; Fig. 13 is a perspective view of a spring guiding block.

Fig. 14M shows diagrammatically the positions of the main gates of the guide wheel, for heavy loads; Fig. 14N is a view similar to Figure 14M showing the positions of the main gates for light loads, for the converter of Fig. 1 and Fig. 55; Fig. 15M is a diagrammatic development of the impeller entrance and discharge vanes, for heavy loads; Fig. 15N is a view similar to Fig. 15M for light loads. Fig. 15A is a diagrammatic view illustrating an alternative design of impeller vanes wherein the movement of entrance vanes is limited by the discharge vanes; Fig. 15B is a diagrammatic view illustrating how the movement of the entrance vanes is checked not only by the discharge vanes, but also by separate stops. Figs. 16A to 16L show various main runner vanes in combination with auxiliary vanes; Fig. 16A shows thick auxiliary vanes interposed between the main vanes; Fig. 16B shows small auxiliary vanes positioned between the main vanes; Fig. 16C shows auxiliary vanes located in front of the main vanes; Fig. 16D shows a split vane; Fig. 16E shows an embodiment having one auxiliary vane positioned intermediate the main vanes; Fig. 16F illustrates auxiliary vanes positioned in front of the main vanes; Fig. 16G illustrates diagrammatically the resulting turbulence where main vanes are employed without auxiliary vanes; Fig. 16H illustrates two differently shaped auxiliary vanes positioned in front of the main vanes; Fig. 16I illustrates an embodiment having four auxiliary vanes at the inlet to the main vanes; Fig. 16K illustrates one thick auxiliary vane positioned posterior to the entrance edge of the main vanes; Fig. 16L illustrates spring auxiliary vanes; Fig. 16M is a diagrammatic development of runner vanes in the same converters for heavy load; Fig. 16N is a view similar to Fig. 16M for light load; Fig. 17A illustrates a guide wheel vane having two sections adapted to form one streamlined vane; Fig. 17B illustrates semi-free auxiliary vanes; Fig. 17M illustrates pivoted entrance vanes for the guide wheel for heavy loads; Fig. 17N is a view similar to Fig. 17M for light load;

Fig. 18 shows a runner vane; Fig. 19 is a perspective view of a pivot for the same vane.

Figs. 20 to 26 illustrate alternative designs of the main gates;

Fig. 20 illustrates gates having a stationary front section and a shiftable rear section;

Fig. 21 is a vertical section of gates having a pin and block adjustment mechanism to vary the angle of the gates;

Fig. 22 is an elevational view of Figure 21 showing further details of the adjustment mechanism;

Fig. 23 is an elevational view illustrating a modified form of adjusting mechanism;

Fig. 24 is a vertical section of Figure 23;

Fig. 25 is an elevational view illustrating a link adjustment means for controlling the angle of the gates;

Fig. 26 is a vertical section of Figure 25;

Figs. 27 and 28 are vertical sections representing two different designs of shifting units.

Fig. 29 is a vertical section showing a synchronizing mechanism with coil clutch.

Fig. 30 is a vertical section of a synchronizing mechanism wherein flat springs are employed;

Fig. 31 is a view taken on the line 31—31 of Figure 30;

Fig. 32 is a vertical section of a synchronizing mechanism combined with a one-way clutch;

Fig. 33 is a view taken on the lne 33—33 of Figure 32;

Fig. 34 illustrates an entrance guide vane;

Fig. 35 is a vertical section through a converter combined with a planetary gear transmission;

Fig. 36 illustrates a diagrammatic development of the vanes in the same converter.

Fig. 37 is a section showing a device with shiftable runner

Fig. 38 shows a combination of a turbine transmission with a mechanical clutch.

Figs. 39 and 40 represent a transverse section and a longitudinal section, respectively, of a modified construction of a one-way clutch for converter of Fig. 1.

Fig. 41 is a vertical section of the upper half of a reversible turbo-transmission; Fig. 42 is a view of a sleeve which operates the vanes in Fig. 41; Fig. 43 illustrates various positions of the runner vanes of the same device.

Fig. 44 is a vertical section of the upper half of another means of turning and adjusting runner vanes.

Fig. 45 is a vertical section of the upper half of a multi-stage turbo-transmission.

Fig. 46 shows an arrangement where the fluid device is located at the rear end of a gear transmission.

Fig. 47 illustrates a water cooled turbo-transmission.

Fig. 48 shows a double flow transmission; Fig. 49 illustrates a modified two stage transmission;

Fig. 50 is a diagrammatic view illustrating the control means for the gates of Figure 49;

Fig. 51 is a sectional view of a modified torque converter wherein reverse is obtained by shifting the guide vanes into and out of the fluid circuit;

Fig. 52 is a diagrammatic view of the vanes of the device illustrated in Figure 51;

Fig. 53 is a sectional view of a device wherein reverse is obtained by means of swinging vanes;

Fig. 54 is a sectional view of a transmission having two guide wheel channels, one of which is adapted to give a reverse drive;

Fig. 55 shows a two stage device for high gear ratios; Fig. 56 illustrates diagrammatically the vanes; Fig. 57 represents the clutch of the device of Figure 55.

Fig. 58 shows another two stage device.

The invention will be fully understood by referring to the accompanying drawings forming a part of this specification, in which:

Figures 1 and 4 illustrate a form of my turbine torque converter equipped with a radial turbine runner with one set of vanes, an axial impeller and a guide wheel, each with two sets of vanes. The device is also equipped with a change speed gear transmission for reversing purposes, and with a pump which circulates fluid.

The numeral 50 indicates a fluid-tight stationary casing to which a cover 51 is fastened by bolts 52. The casing 50 is rigidly secured to a fly wheel housing 53 of a power engine by means of screws 54. The casing 50 has a stuffing-box 55 and a ball bearing 56 for a driving shaft 57, which shaft is secured by means of a spline 58 to engine crank shaft 59. The spline permits relative longitudinal movement, but prevents any rotary movement to facilitate manufacturing and installation of the device. The crank shaft carries a fan shaped fly wheel 60 by means of bolts 61. The fly wheel blows cooling air against the casing 50.

Mounted on the shaft 57 by bolts 62 is an impeller assembly comprising an impeller shroud 63 formed integral with the fixed blades 64, see also Fig. 15, impeller web 65, bolts 66, each bolt carrying an oscillatable vane 67, pivoted at its leading edge adjacent to the outlet from the guide vanes and capable of adjusting itself to the direction of discharge from the guide vanes. The inclination of the vanes 67 is determined by springs 68, 69, see Fig. 3, under the control of the impinging fluid pressure. Each vane has a finger 70 projecting into a slotted opening 71 in a ring 72. Each of the springs 68 or 69 is located between a portion 73 of the ring and a portion 74 of the web 65. A series of these springs may be employed.

In the operation of this device, when the fluid pressure against the vanes 67 increases at light loads, the spring 69 is compressed while the spring 68 is elongated, and each vane as a whole turns about its pivot, and its entrance angle is therefore decreased. See Figure 15N. All of the vanes must turn simultaneously around their pivots since they are connected by a common ring. Every position of the ring corresponds to a certain inclination of all the vanes 67. At heavy loads fluid pressure diminishes due to the action of the guide vanes, and the entrance angles of the vanes 67 increase. See Figure 15M.

Pitch "$p$" and height "$h$" of the vanes in each set is determined according to the deflection required in each particular set of vanes (for definition of terms "h" and "p" see Figures 15N and 16N). Centerline of the vanes (angle b) must be at an angle to the direction of the incoming fluid (angle b').

Figs. 15A and 15B are perspective views showing modified forms of the same vanes, wherein vanes 64A and 64B are fixed vanes and 67A and 67B are spring type regulated vanes. The height to pitch ratio and the number of discharging vanes is selected so that the fluid will generally follow the vanes, but at heavy loads the effective discharge angle of the impeller vanes is smaller (to tangent), and at light loads the effective discharge angle is larger and practically equal to vane angle. The result is as if the impeller vanes are flexible, the impeller is unloaded at heavy loads.

Runner assembly in Figure 1, see also Fig. 2, 16M, 16N, 18 and 19 consists of: a web 75, a shroud 76 and rivets 77 fastening the shroud to the web. Each of the spring-regulated vanes 78, 78A, 78B (of different length) is provided with pivots 79, 80 and with a finger 81 projecting into an opening 82 of a common ring 83, which is rotated by a spring 84 located between portion 85 integral with the ring 83 and portion 86 of the web 75.

In operation, when fluid pressure against the vanes 78 increases at heavy loads spring 84 compresses, and each vane as a whole turns about its pivots 79, 80 and its entrance angle increases, see Fig. 16M. At light loads, however, fluid pressure diminishes, the torque of the runner decreases, and the entrance angle of the vanes 78 decreases, Fig. 16N.

The runner assembly as a whole is secured to a driven shaft 87 by means of a spline 88 and a nut 89, which shaft is supported by ball bearings 90, 91 using nuts 89 and 92 to restrict relative end motion, and is integral with a main drive gear 93. Pivots 79 and 80 are provided with slots 94, and are welded or brazed to the vane 78, see Figs. 18 and 19. Design of the finger 81 is the same as shown in Fig. 19 for pivots. It is to be noted that the runner vanes are divergent at heavy loads, Fig. 16M, in a manner similar to the stationary guide vanes used on turbine pumps for changing the water velocity into pressure; the angle C is greater than 90°. At light loads, however, the runner vanes are convergent and therefore are similar to water turbine vanes, Fig. 16N; angle C is less than 90 deg.

Figs. 16A to 16L illustrate alternative constructions of turbine vanes, (it is apparent that the same or similar construction can be used for the impeller or the guide vanes). Vanes in Fig. 16A have a flat portion B'C' on face side to keep the fluid toward the back of adjacent vane at the point of sharpest curvature. One shorter auxiliary rectifying vane 78A'' is located between two main vanes 78A'; in this way the flow is divided into two streams by each vane 78A'' at the inlet, but both streams unite after being rectified so there is no additional friction to resist the flow in the narrow outlet channels. The stream coming out of the channel forward of the vane 78A'' flows into the boundary layer on the main vane 78A' and imparts the fresh momentum to the particles in it which have been slowed down by the action of viscosity. Due to this energy the particles of fluid do not break away from the main vane 78A'.

The main vanes 78A' are provided with small ducts 123, which join the high pressure space at the nose of vanes, with the low pressure space at the back of the same vane. By means of these ducts the pressure is equalized so that the tendency of the streamlines to jump over as well as to leave the backs of the vanes is prevented.

In Fig 16B portions AB, CD, DE are of conventional design, part AF is especially long and easily curved back so fluid can follow even if the striking angle is small. Part EF has sharp curvature but part BC of the adjacent vane being almost straight forces fluid against the back of the vane, so that no dead space with eddy currents can be created. Two auxiliary vanes, one longer and one shorter, located in the vicinity of sharp curvature force fluid against the back of main vanes 78B'.

Fig. 16C shows the small vanes located in front in reference to the flow direction and a little back in reference to the direction of rotation of main vanes. The auxiliary vanes 78C' prevent the separation or breaking away of streamlines from the main vanes 78C. When the angle of flow at the entrance is too great the change in the flow direction is too great at the inlet into the main vanes, and the flow does not follow the walls but breaks away from them. The flow coming from the auxiliary vanes 78C' flows into the boundary layer on the back side of the vanes 78C and imparts fresh energy to the fluid in the boundary layer which has been slowed down by the action of viscosity or internal friction of the fluid. When guided in this manner the particles do not break away from the walls.

In Fig. 16D two sets of spring vanes 78D and 78D' work in series and are balanced by weights 78G, 78G'; at high speeds they fold into one vane shape; at low speeds vanes 78D' guide fluid so it cannot leave backs of vanes 78D.

Fig. 16E illustrates relatively thin vanes 78E, with auxiliary vanes 78E' inserted between main blades in the place of sharpest curvature, this in order to increase guidance in the widest space between the vanes, to prevent turbulence and dead space.

Vanes shown in Fig. 16F, H, I, K and L are other alternative designs to prevent turbulence when the impact angle of fluid is not correct. In Figure 16F comparatively few main vanes 78F are used while a greater number of rectifying auxiliary vanes 78F' are employed. Further, the auxiliary vanes 78F' are of varying length. Figure 16K has an auxiliary vane 78K' which is used between two main vanes 78K. The entrance edge of the auxiliary vane 78K' is further back behind the entrance edge of the main vanes, to prevent too sudden a restriction of the flow in its passage. In Fig. 16I the main vanes 78I are spaced and designed similarly as in water turbines, their number being small, because they receive the fluid, as in water turbines, at proper angle, the flow being rectified by a large number of entrance vanes 78I'.

It is known from experience that ratio of radial height "h" to pitch "p" of the vanes cannot be too small, otherwise the guidance of the vanes is not sufficient. The height "h" of the vanes is measured in the direction of radial flow for radial vanes, and in the direction of axial flow for axial vanes; see Figures 15N and 16N.

In order to prevent eddy current losses I insert a plurality of short vanes between the main and long vanes. The main vanes (compare Fig. 16I) have $H/P$ ratio between .5 and 3 and are substantially cell-shaped, i. e., a trajectory drawn at the end of one vane and perpendicular to streamlines intersects the next vane. The trajectory TT drawn at the entrance of a main vane 78IA and the trajectory T"T' drawn at the end of the main vane 78IB of Figure 16I. The space between trajectories TT and T"T' and vanes 78IA and 78IB is called a cell, hence the name cell-shaped vanes.

Regardless of this $h/p$ ratio for the main vanes, which proved to be correct and efficient for steam and water turbines, as shown in Fig. 16G, eddy currents and turbulences between blades cause substantial losses because in the turbo transmission the relative angle of incoming fluid is very seldom parallel with the entrance portion of the vanes. In Fig. 16G four streamlines are drawn: Nos. 2, 3, 4 are deflected between the vanes but leave a large space of dead fluid between the streamline and the back of the front vane. No. 1 streamline, being under the pressure of 2, 3, and 4 deviating streamlines, jump over the nose of the second vane and flows between the second and third main vane. Very high velocity is developed when a streamline has to jump from one space into another around an edge of comparatively great curvature, and consequently energy losses are great. This, however, can be prevented by inserting a number of auxiliary short vanes between the main vanes (Fig. 16H) or in front of the main vanes (Fig. 16I).

These short vanes, having greater deviating power than the main vanes because they are spaced closely together, deflect the streamlines at once at the entrance end of the main vanes and prevent dead fluid spaces, turbulence and eddy currents as well as jump over of streamlines from one space into another, see Fig. 16G. In Fig. 16H longer vanes 78H' are located adjacent to the back of a main vane 78H, so the streamline is forced to follow the back of the main vanes, while shortest auxiliary vanes 78H" are located near to the face of main vanes, to force fluid to follow back of adjacent auxiliary vanes, and also to prevent excessive pressure of streamlines 1, 2 and 3 on the face of main vanes which causes jumping over of stream. This arrangement causes the flow of fluid to be entirely orderly between the main vanes, and due to this, fluid is deflected to a greater extent, without being throttled unnecessarily by long vane ends having small angles and creating much friction. The result is just as if the entrance angle of the main vanes were correct, i. e., parallel to the incoming streamlines; consequently a small number of main vanes can be used as in water turbine practice.

The only condition is that short vanes must rectify completely streamlines and make them parallel to the main vanes. Auxiliary vanes therefore, must be spaced as if they were independent sets of vanes, and their ratio of $h/p$ must be also between .5 and 3; preferably their ratio $h/p$ should be equal or greater than $H/P$ of the main vanes. The invention uses, therefore, two sets of vanes, auxiliary or rectifying vanes, and main vanes, both sets designed to perform their purpose independently from the other set. The auxiliary vanes can be located either between the main vanes or in front of them. The same applies to semi-free vanes and spring vanes. I have tested many different constructions and discovered that they must be spaced as if they were independent sets of vanes. In Figure 17A two sets of vanes 98D and 98C work in series, but they can fold into one hydrofoil vane. In Fig. 17B is one semi-free vane 98F per each main vane 98E. This arrangement would be sufficient if the entrance angle were correct, see arrow (full line). As soon as the entrance angle is incorrect, see dotted arrow, number of semi-free vanes becomes insufficient, due to larger deviation to be accomplished, and additional vanes must be added (shown dotted), otherwise turbulence results.

In Figures 15M and 15N the vane entrance angle equals $b$, while fluid entrance angle is $b'$, and first row of vanes must be spaced so the ratio $h/p$ lies between .5 and 3, which limit holds for any correctly curved vanes.

Due to the double curvature of the fluid channel, any adjustable vanes, semi-free vanes, or spring vanes can be of only short length and their guidance is therefore limited. Were angles $b$ and $b'$ the same, there would be no sudden change in the streamlines direction at the entrance of the vanes, and the vanes 66 and 64 could be designed as one vane from the standpoint of guidance. When, however, the flow point of angle $b'$ is smaller than vane angle $b$ then: (a) the angle of deflection is increased; (b) the turbulence between vanes is created; and (c) flow is not streamlined parallel with the vanes, therefore not rectified at the point of entrance in the second sets of vanes. These three items $a$, $b$, $c$ require better guidance which can be obtained when the ratio $h/p$ lies between .5 and 3. In turbine practice usually the ratio is about .75. It can be seen in Figures 15M and 15N that the number of auxiliary vanes is greater than the number of main vanes, simply because the flow must deviate more quickly at the entrance to the vanes than between the main vanes. The curvature is therefore increased so that the guidance of the flow may be more effective. It is true that efficiency of impellers, runners or guide wheels is improved when semi-free, spring, or other auxiliary rectifying vanes are adapted in the design. Increase in efficiency, however, can be obtained only when the auxiliary vanes are spaced according to the ratio $h/p$ lying between .5 and 3.

It is only natural that higher ratio $h/p$ must be used when difference in entrance angles of fluid and vanes is greater, and smaller ratio can be selected when the difference is less.

This discovery also explains, why it is wrong to use sharp curvature on one part of a vane while the rest of the vane has easy curvature. Whenever in any part of the vane curvature increases, the $h/p$ ratio should be increased in the same proportion, otherwise the fluid does not follow the back side of the vanes and eddy currents with turbulence result.

A characteristic combination of features of the blades in the invention is, that each individual vane is of hydrofoil shape; that the $h/p$ ratio of each set of vanes must be between .5 and 3, regardless how many sets are used; that auxiliary or rectifying vanes are interposed between main deviating vanes or they are located in front of the main vanes; that main vanes are to deviate fluid only to such degree as if the fluid entrance angle were correct, that the deviation of the main vanes is not only orderly but more effective due to the fact that streamlines are parallel with main vanes, see Fig. 16H; that shortest auxiliary vanes are only about half as long as the main vanes, preferably shorter; that the back side of vanes is a parabolic curve with decreasing curvature (increasing radius of curvature) while the front side is a straight line connecting the blunt nose of the vane with the part where its tail starts, this in order to force fluid more against the back side of the forthcoming vane.

The advantage accruing from the present invention of blading, suitable for variable speed transmission, lies in the fact that it can receive fluid from any direction, that it allows of a very small exit angle and a corresponding increase in angular momentum, with reduced wetted areas and frictional losses. With the same circumferential pitch of the new blading, the radial height $h$ may be materially reduced. Furthermore, there may be a reduction in the number of large, main vanes, which results in decrease in the manufacturing cost and size of the machine.

Guide vane assembly, see Figures 1, 4, 14M, 14N, 17M and 17N, rigidly attached to the cover 51 includes: a web 95 integral with the cover 51, a shroud 96 fastened to the web by bolts 97, each carrying an eccentrically pivoted entrance yieldable vane 98, 98A, 98B and bolts 99, each carrying an eccentrically pivoted main gate 100. Each entrance vane 98 has a finger 101 which projects into a ring 102 and is operated by means of a spring 103 in exactly the same way as the runner vanes are turned. All vanes must rotate simultaneously being connected together by the common ring.

The stronger the fluid pressure, the more the spring is compressed at heavy loads, Fig. 17M, and the entrance angle B increases; at light loads, however the angle B is small (Fig. 17N).

In reference to the entrance guide vanes 98, see Fig. 34, it is to be noted that the fluid enters in the vanes at an angle X which equals 90 deg. in Fig. 34, to the axis of vane rotation which is the bolt 97. The fluid leaves, however, at an angle Y, to the axis of rotation, which is considerably smaller than the angle X. Whenever the vane 98 changes its actual entrance angle B by a certain amount, while turning about the bolt 97, the resulting change in discharge angle C is also considerably smaller than the change in the angle B. As may be seen from the drawing, when angle Y equals zero, the change in angle C is also zero. If the angle Y were equal to 90 deg., any change in the angle B would correspond to the same change in the discharge angle C. This is a desirable feature because the angles of the guide vanes, upon entering the fluid vary much more than angles of the discharging fluid. Fig. 17A illustrates an alternative design of guide vanes wherein the first set of vanes 98D are yieldable vanes balanced by weights 98E (as used in Fig. 55), the second set are stationary vanes 98C. At high speeds both of the vanes fold together and form in effect substantially one vane. At low speeds, vanes 98D guide fluid in such a way that it cannot leave the backs of vanes 98C, and no turbulence can be created.

The main gates 100, Figures 14M and 14N, are also pivoted at their leading edges, adjacent to the outlets from the entrance guide vanes and can adjust themselves, at light loads only, to the direction of fluid flow so that fluid flows through the gates without shock or impact, see Fig. 14N. Each vane 100 has a finger 104 projecting into an opening 105 of a common ring 106. The ring has several internal teeth 107, see Fig. 4, meshing with a spur gear pinion 108 integral with a shaft 109 supported by the cover 51 and carrying a pedal lever 110. Pins 111, projecting into the gates channel serve as stops and the limit movement of the gates in one direction, see position L (low speed) in Fig. 14M. The position D (direct drive) in Fig. 14N is the limit of gates inclination in the other direction, where discharging tip of one gate vane touches inlet end of the next gate vane. Position H between L and D is for high speed when the impeller and the runner are not locked together, and when the device works as a turbine clutch.

The ring 106 is supported by the cover 51. All of the gates 100 must rotate simultaneously around their pivots because all of the fingers of the gates are connected by the common ring, and every position of the ring corresponds to a certain inclination of the gates.

By means of a pedal lever 110 the driver of the vehicle can unload the impeller and speed up the engine as much as desired, because it is possible to change the inclination and channel area of the gates, so that the discharge angle of the gates corresponds to a certain quantity of passing fluid. It is thus possible to return more energy to the impeller when desired. By means of this pedal it is also possible to stop the flow of fluid entirely, see Fig. 14N dotted, in the same way as on water turbines. The purpose of this pedal is to obtain additional torque and acceleration of the vehicle, whenever desired.

This turbo-transmission of itself does not provide a reverse motion. To reverse the direction of movement of the vehicle a reverse gear is used, which can be equipped with a supplementary train of gears to afford an extra low gear ratio for emergency use if desired.

The cover 51 serves also as a case for a change speed gear, which can be of any well known construction, but I prefer a sliding change gear type in which a sleeve is shifted by foot pedals of my own construction. A third shaft 112 is supported by bearings 113 and 114. The bearing 114 being held in position by a nut 115, is carried through a packing 116 in a small cover 117 fastened to the transmission case by bolts 118, and is provided with a spline fitting 119 for the attachment of a propeller shaft flange 120 for a vehicle drive.

The gear 93 meshes with a gear 124 carried by a countershaft 125 on ball bearings 126, and 127 secured in the case 51. The countershaft carries a spacer 128, a gear 129 for reverse and a gear 130 for emergency low speed. The gear 129 meshes with an idler gear 131 and this in turn meshes constantly with a gear 132 revolving on a sleeve 121 and held by plate 122, both sleeve and plate being pressed on the third shaft 112. The shaft 112 carries also a sliding gear 133 shiftable axially on a spline 133A by a fork 134 secured to a shift rod 135. This gear when shifted forward, meshes with a gear 130 and is to be used for emergency.

The end of the countershaft carries a small pump impeller 136 secured by a nut 137 and the same end of the case carries a storage chamber 139. This pump is for circulating and pumping the working fluid in the transmitter.

*The synchronizing clutches*

This mechanism synchronizes the runner shaft with the third shaft by means of friction in moment just before the gears are locked by jaw clutches. The device, embodied in the gear transmission, allows easy shifting from forward to reverse and vice versa without the necessity of bringing the vehicle to a complete stop before the shifting can be effected, as is necessary when shifting ordinary gear transmission into reverse, without danger of clashing gears or otherwise damaging the transmission. Because of the viscosity of the fluid, there is generally some drag of fluid present in a fluid converter which makes shifting in reverse difficult, especially in cool weather.

These novel and useful features are obtained through the use of synchronizing friction clutches, which are located between the forward gear 93 and the reverse gear 132. As may be seen from the drawings, the forward end of the third shaft has a spline 140, and carries a sliding head 141. This head is equipped with two male cone clutch members 142 and 143 fastened together by rivets 147. Engaging with the cone clutches are corresponding female cones 144 and 145 pressed on gears 93 and 132, see Figs. 5, 8, 9, 10. A toothed-seleeve 146 is slidable on the head and is operated by a shift fork 148, and secured to a shift rod 149, supported by a gear transmission cover 150. The teeth 151 and 152 of the sleeve 146 project through openings 155 and 156 in the members 142 and 143 and fit in corresponding internal teeth 153 and 154 on the clutch members 144, 145. Carried within the head is a series of balls 157, yieldingly urged by springs 158. There is a groove 159 on the inside of the sleeve to receive the balls 157.

In order to move the outer sleeve axially, it is necessary to push the balls 157 against the spring pressure into the head. The resistance created by the balls causes the head to slide along the splines on the third shaft, into engagement with the mating cone, then moving forward, the cone 142 engages the female cone 144 on the main drive gear to synchronize the second shaft and the third shaft to enable shifting into forward. As soon as the balls have been lifted out of their groove 159, the outer sliding sleeve 146 can travel on forward until the teeth 151 engage the teeth 153. Shifting into reverse, of course, is similar; first the cone 143 engages the female cone 145, then the balls are lifted out of their groove and the teeth 152 engage the teeth 154.

The ends of the teeth on both of the clutching members are chamfered to facilitate engagement. The synchronizing clutches make an easy shift, by connecting the second and third shaft just before engagement of the jaw-clutches, because there is considerable inertia of the runner and the drag of the fluid to overcome to effect the engagement. Without these friction clutches it is impossible to shift when starting in cool weather, because a cool engine must operate at slightly increased speed and cannot slow down properly, and the drag of the cool fluid is maximum.

The shift rod 149 has a pin 155 engaging a fork 156 of a lever 157 pivotally supported by a stud 158 secured to a gear transmission end cover 117. The lever 157 has two pins 159 and 160, carrying rods 161 and 162. The front ends of the rods are pivotally connected to pedal levers 163 and 164 equipped with pedals 165 and 166. In this way, when pedal 165 is pressed forward, the rod 161 pushes the pin 159 backwards, and the lever 157 pushes the shift rod 149 and the shifting sleeve 146 forward, and vice versa. When operator steps on the pedal 166, the sleeve 146 is shifted in reverse. The pedal lever 164 has a short lever 167 which operates a connecting rod 168, which in turn operates a lever 169 operated by the pedal lever 110. Whenever the operator steps on the pedal 166 or 165 the connecting rod 168 pulls the lever 169 down and opens the gates 100. In this way the gates stay opened at reverse or at forward speed, but they are closed when the gear transmission is in neutral, as shown in Figs. 1 and 2, whenever the gear transmission is in neutral, the turbo transmission is also "declutched."

In Fig. 4, I have illustrated the relative positions of the accelerator pedal, marked A, and the "booster" pedal 110. These pedals are close together and can be both operated by the same foot of the driver, or separately. If desired, both pedals can be pressed down at the same time. Pedal 110 is shown in depressed position, at which time the gates are closed.

On long trips and at high speeds, it is an advantage to connect the runner directly to the impeller for direct drive. This is accomplished by a centrifugal clutch, Figs. 11, 12, 13, the runner web 75 being formed with two inner cams 170, each adapted to be engaged by a roller 171, under the control of centrifugal force of the weight 172 carried by a fork 173, pivotally supported at 174 by the runner web. The deflection of this centrifugal governor is counteracted by a spring 175, supported by a pin 176.

In the space formed between the cam 170 and the impeller 65 are another set of rollers 177 and 178 adapted to engage with an inner cam 179, whenever there is any tendency of the second shaft to overrun the primary shaft 57, i. e., when the inertia of the car tends to make it travel at a higher speed than that corresponding to the engine speed. This action operates to save regular brakes of the car, for the engine can be used as a brake on long steep mountain grades. This is desirable in view of recent legislation in certain States which provides that the engine must be adapted to be used as a brake. The rollers 177 and 178 are constantly under the pressure of a spring 180 by means of a guiding block 181. The other end of the spring is supported by the fork 173.

In operation, when the runner shaft tends to overrun the engine shaft, the cam 179 produces a wedging action upon the rollers 177 and 178; creates friction between the rollers and the impeller web and transmits the turning moment directly from the runner to the impeller. On the contrary, at normal and heavy loads the impeller rotates faster than the runner and no wedging action can occur.

In operation, when the runner rotates at slow speed, the spring 175 maintains the roller 171 out of engagement with the impeller web, so that no torque can be transmitted from the impeller to the runner directly. At very high speeds of the runner the centrifugal force of the weight 172 overcomes the spring 175, rotates the fork 173 about its pivot 174 and brings the roller 171 into engagement with the impeller web. The cam 170 produces a wedging action upon the roller 171, creates friction between the rollers and the impeller, and transmits the turning moment directly from the impeller to the runner, consequently the engine operates the runner shaft directly and the primary and the secondary shafts become locked together.

When the primary and secondary shafts are locked, the centrifugal force tends to circulate the fluid in the opposite direction (working direction is marked by an arrow in Fig. 1), because the inlet of the impeller is of larger diameter than the outlet of the runner, and the impeller being of substantially axial type. This tendency of the fluid to circulate in the opposite direction closes the gates 100 immediately as shown in position D in Fig. 14, and any further fluid circulation ceases. In this way all the hydraulic transmission losses are eliminated, at direct drive. Whenever the runner speed decreases below a certain predetermined speed, the spring 175 disengages the roller 171, and the device becomes a torque converter again.

For balancing purposes, a number of openings 180 in the impeller web, and 181 in the runner web are provided, in order to equalize the pressures on the right and left side of the webs. In order to decrease the short circuit losses through these openings, small clearance spaces 182 to 186 are provided.

Because of efficiency of the drive on long non-stop trips, it is an advantage to eliminate the action of the gates 100. Without influence of these gates my torque converter becomes a mere clutch, where torque on the secondary shaft is at all times equal to torque of the primary shaft, which gives the advantage of direct drive efficiency. Turbine clutches have efficiency up to 98% according to actual measurements. The elimination of the gate losses is accomplished in this invention automatically under the control of fluid. This is an improvement over the device described in my patent application Serial No. 475,278, filed August 14, 1930, where the elimination of the gate losses is effected. In the present invention the discharge angle of the runner vanes is selected such that the direction of flow at light loads through the gates lies between the positions D and L of the gates, see Fig. 14. The eccentrically pivoted gates in position H are free to adjust themselves to the direction of the fluid, so that fluid passes through the gates without shock or impact.

Whenever additional torque is required, the runner slows down and the flow increases, the direction of the flow through the gates increases its angle, consequently the gates turn about their pivots until they are stopped by the pins 111, and the torque increasing function of the gates starts automatically, and the device becomes a torque converter again.

The casing 50 must be completely filled with a fluid, which may preferably be oil. Leakage is prevented by stuffing-boxes 55 and 190. Means for delivering fluid to the casing at all times during operation are provided. Stuffing-boxes consist of sleeves 191, 192 discs 193, 194, springs 195, 196, packings 197, 198 which all revolve with their shafts and in that way diminish the wear of packings, which results in long life of stuffing-boxes. Each stuffing-box is provided with an oil collecting groove 199, 200 to which is connected an oil drain pipe 201, 202 which empties in a larger pipe 203, which in turn runs into the storage vessel 189. Any oil which passes packing in a stuffing-box is drained into drain pipes and then into the storage vessel; this vessel serves also as a reserve tank for working fluid of the converter.

The mechanism which delivers fluid to the casing 50 consists of: an impeller 136, pipes 204, 205 check valves 206 207 cooling coil 208, oil pressure gauge 209, to indicate the fluid pressure while in operation and located on the car dash. The reserve tank is also equipped with a float 210 to indicate quantity of fluid in the tank at standstill, and a filler opening 211; height of the opening determines the level of the fluid in the storage chamber. The cooling coil 208 is located in a water jacket 212. Main fluid casing 50 is connected with gear box 51 by means of holes 213.

It will be seen that the gist of my invention consists broadly in the provision of certain means adapted to set the driving, the driven and the guide vanes of the turbine torque converter at an infinite number of inclinations, during operation, under the control of fluid. In combination with the device a reverse gear is provided with means to synchronize the driven shaft of the converter with the gear transmission shaft to enable reversing.

All the vanes of the converter are capable of operation at infinite number of angular positions, the operation is efficient at all loads and speeds, and therefore the energy is returned to the impeller at any speed and load. The invention contains means to change automatically the torque converter into the turbine clutch under the control of the working fluid.

In Figures 35 to 38 inc. and 41 to 47 incl.; the numerals 220 to 226 incl. indicate the driving shafts; the numerals 230 to 236 indicate the driven shafts; the numerals 240 to 246 indicate the driving wheels, mounted and secured to the driving shafts; numerals 250 to 256 indicate the driven wheels, mounted rigidly to the driven shafts. Numerals 260 to 266 indicate the stationary guide wheels, and numerals 270 to 276 indicate semi-free vanes freely pivoted at their leading edges with the discharge edges overlapping the inlet edges of the following vane so that the pivotal action is restricted in the direction towards the following vane but unrestricted in the opposite direction. The numerals 280 to 289 indicate semi-free vanes freely pivoted at their leading edges, but equipped with stops so as to limit the angle of their inclination. The numerals 290 to 302 indicate rotatatable vanes pivoted at their leading edges, and capable of adjusting itself to the direction of the fluid flow under the control of the fluid pressure, their function is similar to the action of the vanes 78 or 67. The numerals 310 to 318 indicate a housing of a torque converter, and numerals 320 to 327 indicate fixed vanes.

The embodiment of the invention illustrated in Figs. 35 and 36 relates to fluid turbine torque converters having impeller and runner vanes each pivoted near the entrance edge of the following vane so that the pivotal action is restricted in the direction towards the following vane, but unrestricted in the opposite direction. The impeller and runner vanes 270—276 are constituted by short vane lengths and pivotally sustained between web and shroud which are connected and spaced by the final non-pivotal vanes 320 and 321. The vanes 270 to 276 are contained in a closed circuit for operating fluid which circulates in the direction indicated by the arrow. In Fig. 36 are illustrated positions of vanes for impeller and runner for heavy loads in full lines, and for light loads in dotted line. Runner vanes 270—273 are balanced by weights 270A—273A.

In operation, when fluid enters the ring of driving vanes 274 its velocity has a great circumferential component at heavy loads, due to powerful fluid circulation, and consequently the vanes 274 do not energize the fluid but are inactive and adjust themselves to the direction of discharge from the guide vanes, so that the fluid flows through these vanes without shock or impact. Similarly when the fluid encounters the vanes 275 they move forwardly but at a less angle than the vanes 274. Vanes 276 act in similar way, until the fluid enters the fixed vanes 321 and is energized in the usual way. At high speeds, however, the velocity of the fluid has only a small circumferential component, due to diminished fluid circulation, and the fluid passes across the face of the vanes 274 which are restrained from backward movement by the following vanes 275. The vanes 274 consequently energize the fluid at light loads, and function of the vanes 275 and 276 is similar. Runner vanes 270 to 273 act in a similar way but opposite. At light loads these vanes are not active, but at heavy loads the runner vanes 270 to 273 absorb energy from the fluid.

The fluid passage 330 and a series of openings 331 are provided in order to equalize pressures in spaces 332, 333 and 334 and to balance axial thrusts of impeller and runner. It is to be noted that the guide vanes 280 are round at the entrance edge. This is of advantage because the entrance angle of the fluid into these vanes varies. Guide vanes 290, 290A and 290B are of the same design as the vanes in Fig. 16H and their function is similar.

To obtain reverse speed and emergency low forward speed, a planetary gear transmission is combined with the turbine transmission. This reduces the necessary size of the turbine torque converter and increases its efficiency, for the turbo-device can be designed for average working conditions and not for the extremes. A web 335 carried by the secondary shaft 230 serves as a pinion carrier and driving member, and is provided with a series of lateral studs 336 secured into it which carry pinions 337. Gear 338 is the driven member, being rigidly secured to the hub of a clutch drum 339, which in turn is secured to the driven shaft 340. By applying a brake band 341 to a drum 342, gear 343 is held stationary, pinion 344 rolls on it, and the smaller pinion 345 causes the gear 338 to turn slowly in the same direction as pinion carrier. By applying a brake band 346 to a drum 347, gear 348 is held stationary. Pinion 349 rolls on it, and the larger pinion 345 turns gear 338 slowly in the reverse direction. For direct drive a friction clutch locks the clutch drum 339 to a tail shaft 350, and the entire gear mechanism rotates as a unit. The friction clutch is composed of three discs 351, 352 and 353, which are kept in contact and proper driving relation by means of a heavy spring 354. The emergency low and reverse speeds are obtained in a conventional manner by tightening the external contracting clutch bands. High speed clutch plate 352 drives the drum 339 by means of disc 351 and 353. Disengagement of high speed clutch is accomplished by means of a clutch release fork 355 mounted on a clutch lever shaft 356, the fork shifting a sleeve 357 and to release pressure of the spring 354.

Basically the device in Figs. 35, 36 is a combination with a planetary gear transmission of a turbine torque converter comprising a pump impeller, a turbine runner and a guide wheel included in a circuit for fluid. The vanes of the impeller and the runner being pivoted near the entrance edge with the exit edge overlapping the entrance edge of the following vane so that the pivotal action is restricted in the direction towards the following vane but unrestricted in the opposite direction. Some or all impeller vanes can be provided also with stops, to limit the pivotal action of the vanes also in the other direction.

Fig. 37 illustrates a reversible turbine torque converter having a turbine runner equipped with two passage rings 360 and 361. Ring 360 has vanes designed for forward speed, and ring 361 has vanes designed for reverse speed, compare with Fig. 43 for shape of vanes for forward and reverse. Any number of rings can be provided each for different speed. The runner is axially shiftable on a spline 362 of a driven shaft 231, bringing either of passages 360 or 361 into operation.

Principally this device is a reversible torque converter comprising a passage for fluid including a pump impeller, an axially shiftable turbine runner and a guide wheel, the runner being provided with a plurality of passage rings.

At high speeds a centrifugal clutch 11—37 locks the guide wheel to the impeller, and the device changes into a clutch. The clutch 11—37 is illustrated in Figs. 11 and 12.

The apparatus illustrated in Fig. 38 is a combination turbine torque converter with a mechanical clutch. A driving member 365 is secured to a secondary shaft 232, and a driven member 366 of the clutch is splined and mounted on a third shaft 367, a spring 368 operates to force the member 366 into engagement. It is apparent that a mechanical clutch can be attached to the primary shaft as well as to the secondary shaft.

The form of the invention shown in Figs. 41, 42, 43 is a reversible torque converter comprising, a guide wheel with vortex chamber 560, an impeller and a runner. Vanes of the runner are pivoted at 370 and each vane 293 has a pin 371 which meshes with an oval opening in a ring gear 372. The gear is provided with internal helical teeth 373 which are in mesh with a helical pinion 374 carried by an axially shiftable sleeve 375 which can be shifted by means of a lever 376. The lever 376 can be operated by a hand-lever 376B or by a rod 376A, which in turn can be operated by a pedal 378. The pedal is rotatable on a pivot 379 and can be moved in two directions. In one direction it presses on an accelerator A, and in the opposite direction it presses on the rod 376A. The sleeve 375 rotates with secondary shaft 233 being secured thereto by a key 377. In operation, when the pinion is moved longitudinally, the ring gear must rotate about the secondary shaft as its axis; the ring then rotates all of the vanes around their pivots 370 simultaneously. The vanes then take the positions H (high), L (low), R (reverse) or any intermediate position, see Fig. 43. The device is a reversible turbine torque converter comprising a passage for fluid including a pump impeller, a turbine runner and a guide wheel, the vanes of the runner can be manipulated to be deflected in different directions, so as to vary the speed and the direction of the runner.

Similar to this device is a reversible torque converter illustrated in Fig. 44. Each runner vane 294 has a pinion 380 meshing with a common ring gear 381 axially shiftable by means of a lever 382, operatable by a hand lever 382A or by a pedal 382B.

Considerable increase in power transmitting capacity can be obtained by designing a two-stage torque converter, as shown in Fig. 45, comprising a two-stage impeller, a two-stage runner and a guide wheel, the vanes of the impeller, the runner and the guide wheel being pivoted and adapted to adjust their inclination.

A fluid tight guide wheel housing 315 can be locked to a stationary casing 316 by means of a clutch 11—46 (illustrated in Figs. 11 and 12) in one direction only. At high speeds a centrifugal clutch 11—45 (Figs. 11 and 12) locks the impeller and the guide wheel.

Fig. 46 shows a turbine power transmission mounted on the end of a gear transmission. The fluid transmission must have a one way clutch, as shown in Figs. 39, 40, or 11, between the primary and the secondary shafts so that reverse torque of the gear transmission can be transmitted.

In Fig. 47 a water-cooled torque converter is illustrated, having an opening 384 for inlet and opening 385 for outlet for the cooling water. The inlet and outlet may be connected to the car engine or radiator. Runner of the device has two sets of movable vanes entrance or auxiliary vanes 301 and main vanes 302.

In Figures 48 to 54 inclusive, the numerals 390 to 394 indicate the driving shafts; 400 to 404 the driven shafts, 410 to 414, the driving wheels secured to the driving shafts, 420—424 the driven wheels mounted to the driven shafts; 430—434 represent the guide wheels; 440—449 are semi-free vanes freely pivoted at their leading edges but equipped with stops to limit the angle of their inclination; 450—457, 457A, 457B (see also Fig. 16H) indicate fixed vanes; 480—484, 550, 551 represent housings and 500—503 indicate pivoted spring-vanes which function is similar as that of vanes 78 or 67.

The embodiment of the invention illustrated in Fig. 48 relates to a turbine torque converter having two substantially parallel circuits instead of the usual single circuit. The driving member has two passages 460 and 461. The driven member has passages 462 and 463, and the guide wheel has passages 464 and 465, the axial thrust of each two passages being balanced. 550 is a stationary casing, between this casing and housing 480 is a one way clutch 11—48 of the same construction as shown in Fig. 11, to take the reaction of guide vanes.

In a two stage converter, as represented by Figs. 49 and 50, a single stage impeller wheel with vanes 442 and 450, and a two stage runner with vanes 443 and 451 together with a two stage guide wheel with vanes 444 and 445 are used. Fig. 50 illustrates a diagrammatic development of the shape of vanes in the device of Fig. 49. Full lines show positions of vanes at heavy loads, dotted line at light loads. It is apparent from the diagram that the converter works as a single stage mechanism at light loads, for the vanes of the first runner and the vanes of the first guide wheel are not active at light loads but are free to adjust themselves to the direction of the fluid flow. Between the casing 551 and the housing 481 is a one way clutch 11—49, to take reaction of the guide wheel. Between the housing 481 and the impeller 411 is a centrifugal clutch 11—50 as shown in Fig. 11, which locks the impeller 411 with the guide wheel 431 at a certain predetermined speed by the rotative speed in forward direction of the guide wheel. The pivoted vanes 443 and 444 are counterbalanced by weights 443A and 444A, which at higher speeds correct the angle of said vanes. At heavy loads the guide wheel 431 is locked to the stationary casing 551 by means of a rod 445B entering a slot 551A in a hub 551B integral with the casing 551. The rod, loosely supported by a slide 431A is operated by a crank 445A, which in turn is operated by a vane 445. At light loads the vane is forced in the position shown in dotted line by the fluid and operates to disconnect the rod 445B from the slot 551A.

Figures 51 and 52 show a form with axially shiftable single stage guide wheel with two passage rings 470 and 471 interposed between the exit from the driven vanes and the entrance to the driving vanes, and with two passage rings 472 and 473 interposed between the entrance to the driven vanes and the exit from the driving vanes. The ring 472, see position "A" of the guide wheel, is for forward drive and has no vanes, while the ring 473 is for reversing the runner, see position "B" of the guide wheel, and has vanes 457, 457A and 457B. The ring 470 works as a return guide wheel with vane curvature suitable for forward drive, and the ring 471 includes return guide vanes with curvature for reverse speed. The guide wheel has a sleeve 490 sliding upon the secondary shaft inside of the housing 482. Rotary movement of the sleeve is prevented by a key 491. Shifting is accomplished by a fork 492. Semi-free vanes of the runner 447 are provided with two stops 493, 494 see Fig. 52, stops 493 for forward, and stops 494 for reverse speed.

When the guide wheel 432 is shifted only half way, i. e., to position "C", between positions A and B, it is evident that neither ring 472 nor 473 can be active, and the guide wheel is therefore in a neutral position, and the runner does not receive any torque from the fluid. Shifting the guide wheel in neutral affects the runner in the same way as disconnecting the third shaft by a mechanical clutch in Fig. 38.

Basically the device of Figs. 51 and 52 is a torque converter comprising a passage for fluid including an impeller, a runner and a shiftable guide wheel, said guide wheel having plurality of passages between the exit from the impeller and the entrance to the runner and a plurality of passages between the entrance to the impeller and the exit from the runner.

Fig. 53 illustrates a form in which, instead of shifting the guide wheel bodily, the vanes of the guide wheel are manipulated to be deflected in different directions, to vary the flow of the fluid from the impeller to the runner, in order to produce various speeds and directions of rotation in the turbine runner. A set of return guide vanes is interposed between the exit from the driven vanes and the entrance to the driving vanes, to increase the torque of the runner at heavy loads.

A further embodiment of my invention is illustrated in Fig. 54. Here instead of the two guiding passages 474, 475 being concentric as in Fig. 51, they are arranged side by side, and can be shifted axially by means of rods 496. The passage 475 is used for forward speed and has no vanes, while the passage 474 is used for reversing and must have reversing vanes. These guiding passages receive the outwardly delivered fluid from the driving member and guide it to the inlet of the driven member. A stationary return guide wheel 434 is provided, being interposed between the exit from the runner and the entrance to the impeller, in order to increase the gearing ratio of the torque converter. The wheel 434 is freely supported by shafts 394 and 404 but is prevented from a rotary motion by a projection 497 sliding in a groove 495 of the guiding passages 474 and 475.

Figs. 55, 56, 57 illustrate a turbo transmission having a driving shaft 600 with a disc 601 connected to a disc 602 on a shaft 603 with a one stage impeller 604 equipped with vanes 605, 606 of the same design as shown in Figures 15M and 15N, 15A or 15B; a driven shaft 607 with a two stage turbine 608, first stage with vanes 609, 610 and the second stage with vanes 611, 612 of similar design as shown in Figures 16M, 16N, or in Figs. 16A, 16B, 16C, 16D, 16E, 16F, 16H, 16I, 16K, 16L, and a rotatable guide wheel 613 with two sets of vanes; the pivoted entrance vanes 614 are of the semifree type, having stops 614A, the discharge vanes 615 of the same design as illustrated in Figures 17M, 17N or 17A, 17B. Spring vanes 615 are pivoted at 615A and are balanced by weights 616. The weights put the vanes in the position shown dotted in Fig. 56 at high speeds, and the vanes function as driving vanes, while at lower speeds they occupy position shown by full line and function as guide vanes. One or more vanes 614 controls connection between the guide wheel 613 and a stationary housing 617 in the following manner. The vane 614 is mounted on a shaft 620 carrying cranks 621 and 622 with connecting rods 623 and 624 resp., loosely supported by guides 625, 626 resp., integral with guide wheel 613. A spring 627 operates through the collar 717 to prevent the rod 624 from entering a slot 619 in the hub 618 of the stationary housing 617. At heavy loads, however, fluid will deflect the vane 614 (Fig. 57) in the direction of the arrow which in turn forces the rod 624 into one of the slots 619, which results in connection of the guide wheel 613 to the stationary housing 617, so the guide wheel can react against the increased turning moment of the fluid at heavy loads. At light loads or at high speeds, when torque increase is not required, the vane 614 and the spring 627 overcome the friction, and the rod 624 disengages from the slot 619 making the guide wheel free to rotate in the forward direction. The device then functions as a single stage turbo clutch.

At still higher speeds the centrifugal force of the weight 628 on the rod 624 forces rod 623 by means of the crank 621 into a slot 630 in the impeller hub 631, which results in connection of impeller and guide wheel rigidly together. At the same time centrifugal force of the weight 616 turns the vanes 615 in position shown dotted in diagram Figure 56, so the guide wheel acts as an efficient impeller of much larger diameter than the original impeller 604.

In this way the device functions as a two stage turbo clutch, the capacity of the machine is increased, circulation of fluid decreased and consequently efficiency increased.

At still higher speeds, a preselective servo clutch 632 connects impeller shaft 600 and turbine shaft extension 607A making a direct drive, that is the impeller, the runner and the guide wheel then rotate as a unit.

Operation of the synchronized jaw clutch 632 is following: At certain predetermined speed centrifugal force of a weight 633 engaging a ring 648A (center line of the ring is identical with the center line of the shaft 607) integral with a fork 648 rigidly mounted on a valve stem 649 fastened to an arm 700 of the turbine shaft 607 by a pivot 701, by means of a fork 634 opens a double valve 635 mounted on a valve stem 649 and regulated by a spring 636. The valve connects a pipe 639 with a pipe 638, which pipe is connected to manifold of the car engine (not shown) when vacuum is used for clutch operation. When oil pressure is used for clutch operation, the pipe 638 is connected to the oil system of the engine, the best is to connect it to the discharge end of the engine oil pressure pump, or it can be connected to a pressure system of any kind such as to a source of compressed air employed for the operation of the brakes. The pipe 639 leads to a cylinder 640 equipped with a piston 641 having a piston rod 642 operating the clutch 632 by means of a collar 709 which in turn operates a circular cam 710 integral with jaws 708. When a pressure is applied on the left side of the piston 641 or vacuum on the right side of the piston, rod 642 moves to the right, pushes collar 709 and cam 710 to the right, which in turn lifts a bell-crank 711 pivoted at 712. The other end 713 of the bell-crank 711 presses on a disc 714. A disc 715 is positioned between disc 714 and the element 602, in mesh with a spline 707 on the shaft extension 607A synchronizes the shafts 600 and 607. Further movement of the piston rod to the right forces jaws 708 in mesh with spline 707 making a rigid connection between the shafts 600 and 607. As soon as pressure or vacuum is released a spring 716 returns piston 641 to the left side and releases the clutch 632.

Pipe connection 705 connected to the left side of the piston is used when oil or air pressure operates the clutch. As illustrated in Figure 55A a connection 706 may be employed when vacuum operates the coupling.

Whenever double valve 635 opens pipe 639, it closes at the same time a discharge pipe 703 and vice versa.

Power of the spring 636 can be regulated by a hand lever 643 held in any desired position by a pawl 645 meshing with a toothed segment 644. The pawl is held by a spring 718. The lower end 719 of the lever 643 is not in contact with the stem 649, but there is a certain amount of clearance so that the spring 636 could be adjusted to change the compression thereof. The lever 643 is mounted on a fixed pivot 643A.

Power of the spring 636 and of course the time of opening of the valve 635 is regulated automatically also by inertia of a weight 646 mounted upon the upper end of a lever 647. The lower end of the lever enters the fork 648 integral on the valve stem 649. Mounting of the weight 646 must be such that the higher the acceleration of the car or the steeper the upgrade, the greater the inertia force of the pivoted weight 646 is to close the valve 635. The valve therefore opens only at higher speeds, so that direct drive can be effected at high speeds only. Movement of the car towards the left in Fig. 55 causes an inertia force to be exerted on the weight 646 in the direction of the arrow 724. Movement of the weight 646 is transmitted through the collar 648 to oppose the action of the governor weight 633 thereby restraining the governor from urging the valve 635 in the opening direction and thereby delaying the clutching operation.

The speed of the vehicle at which direct drive commences can be varied at will, by moving the lower end 719 of the lever 643, which increases or decreases the pressure of the spring 636. The greater the pressure of the spring 636 the smaller the car speed must be when centrifugal force of the weight 633 overcomes force of spring 702, spring 636 and counteracts spring 702.

Further the greater the suction in manifold or the greater the oil pressure the less power it takes to open the valve and consequently shifting in direct occur early at lower speeds and the car in direct at lower speeds. At wide open throttle, the differential of fluid pressure in the engine manifold is negligible, and the valve opening is not assisted by pressure difference in pipes 638 and 639, hence the car rides in direct at higher speeds only. It is known the pressure in the manifold of an engine is a measure of the engine load, because it indicates how much air goes into the engine, and the torque of the engine depends directly on the amount of air admitted through its manifold. If oil pressure is employed to actuate the piston 741, the pressure being a maximum at high speed operates in a similar manner. The volume of air supplied to a gas engine per second is equal to $av$, where "$a$" represents the area of manifold and "$v$" equals air velocity; the weight of this air equals $avK$, where K is equal to the specific weight of air. It is known that $$\frac{p}{k}$$

is a constant, i. e., during isothermal expansion the specific weight is directly proportional to the pressure in the manifold $p$. The weight of air is then equal to $avk$ and is proportional to $vp$. The weight of the air is also proportional to the energy per second or to horsepower, then horsepower HP is proportional to $vp$. (1)

Further the velocity "$v$" is in direct proportion to the engine speed, and "$n$" indicates the revolutions per minute of the engine.

As known torque $t$ equals $$63000\frac{HP}{n}$$

then:

is proportional to $\frac{HP}{n}$ is proportional to $\frac{vp}{v}$ equals $p$ (2)

From Equation 1 it is seen that the horsepower of an engine is in proportion to the velocity $x$ the pressure in the manifold.

Equation 2 shows that the engine torque is proportional to the manifold pressure "$p$." Consequently the harder the engine works, the greater the torque, the greater the manifold pressure, the more power it takes to open the valve 635, and consequently the shifting in "direct" occurs later and only at higher speeds, and the car runs in "direct" at higher speeds only.

The above equations are usually considered correct for practical purposes; if, however, efficiency of combustion and losses to the water jackets are considered, then the above equations are only approximately correct. However, the discrepancy is very small within operative range and requirements.

A reserve and cooling tank 651, equipped with a cooling waterjacket 652, furnishes fluid to the impeller through pipe 654. Hot fluid from the transmission enters in the cooling tank by a hole 653.

Integral with the turbine shaft 607 is a transmission gear 153A. The rest of the gear transmission is the same as shown in Fig. 1.

It is of importance to note in relation to the device of Fig. 56, that efficient turbo clutch operation requires that the number and angle of impeller entrance vanes be equal to the number and angle of turbine discharge vanes, and vice versa.

Basically Fig. 55 illustrates a hydraulic power transmission having a clutch connecting driving and driven element, said clutch being synchronized and operated by power from the engine.

Fig. 58 illustrates a fluid device with an impeller 660 fixed to a shaft 661, a two stage runner 662 on a shaft 663 having spring vanes 664 and balancing weights 665, the moment of these weights determining the inclination of the vanes according to the rotative speed of the turbine runner for the centrifugal force of the weights, fluid pressure on the vanes and spring pressure—they all must be in balance, in the first stage, and semi-free vanes 666 and fixed vanes 667; a guide wheel 668 with vanes 669 balanced by weights 670, and stationary housing 671.

Direct drive coupling is operated pneumatically and/or at will. Plungers 672 with pistons 690 in cylinders 674 located in the runner 662 can be pushed in holes 673 in the impeller 660 by means of air pressure created in a cylinder 677 provided by a piston 676, which piston prevents entering of fluid in the cylinder. Pipe 678 connecting cylinders 674 and 677 has a valve 679 equipped with a spring 680 and a solenoid 681. The valve opens by means of centrifugal force, the steel valve and stem 679 being a permanent magnet is under the influence of the solenoid, which can act in the same direction or in the opposite direction as the centrifugal force. In this way the valve opens at lower or higher speeds as desired. Electric current comes to the solenoid through an insulated wire 682, shown dotted, from a contact ring 691, a rheostat, and a switch, etc. (not shown), located on car dash.

Turbine shaft 663 has a sun gear 683 meshing with a planet gear 684 which in turn meshes with a ring gear 685 carried by a guide wheel casing 668. Planet gears 684 are rotatably mounted on a rotatable planet carrier 686. A one way clutch 687, mounted on a hub of the housing 671, permits rotation of the planet carrier in the direction of turbine rotation, but prevents its rotation in the opposite direction.

When starting, or at heavy loads, the guide wheel revolves in the reverse direction and its turning moment is transferred to the turbine shaft by the planet gears. At high speeds or at light loads, the guide wheel has a tendency to rotate in the same direction as the turbine, which is allowed by the one way clutch.

The plungers 672 are tapered, and when the plungers are forced in the holes 673, they enter first in a groove 692 and friction created by wedging action of plungers synchronizes rotation of the impeller and the runner, after they synchronize the plungers enter holes and make solid connection to effect direct drive.

Whenever the speed of the runner decreases, centrifugal pressure of the circulating fluid diminishes and consequently the air pressure decreases. Air expands and drives the piston 676 to the right. Then pressure of the spring 693 pulls the plungers out of holes 673 and the runner is uncoupled from the impeller.

In reference to design of vanes used in these devices, they are illustrated in Figs. 15, 16 and 17. It is of importance that any vanes deviating a fluid should have a portion, where the flow angle is 90 deg., thickened so as to diminish the losses which would occur when the flow velocity is decreased, from circumferential to radial or axial. Exactly the same result can be obtained by gradual diminishing width of the flow channel at the entrance in the vanes, making the channel narrowest in the place where vanes are perpendicular to circumferential velocity as shown in Fig. 16L. In this figure the auxiliary blades 78L' are mounted between two annular shrouds 720 and 721. These shrouds are shiftable as a whole with the blades in relation to main vanes 78L as follows, at heavy loads the springs 122 compress and the blades take a position between the main vanes as shown dotted, position L and help to keep the fluid toward the back of the main vanes. At light loads, however, they take a position shown in full location T, so an auxiliary and a main vane form one vane, to diminish head resistance.

In Fig. 16A, channels 123 connect the high pressure side of the vane faces with the suction side of the vane backs to prevent jumping over of streamlines because of excessive pressure at vane face. This operates to prevent vacuum or the creation of a turbulent area on the back of vanes.

In Fig. 16I, the main vanes 78I are limited in number and may be made from sheet steel as in water turbine practice. Auxiliary vanes 78I', however, are increased in number and have thickened blunt noses. Their angle of divergence "E" is smaller than 20 deg., so they can receive fluid from any angle without losses of energy when changing velocity into pressure. If there were no entrance vanes 78I, the losses in eddy currents and in turbulence between the main vanes would be prohibitive (see Fig. 16G).

It is only natural that the auxiliary vanes which happen to be opposite to the main vanes are made integral with main vanes. This construction does not change the basic idea of the invention to provide a rectifying zone in front of the main vanes, so the main vanes would receive fluid at correct angle, see small arrows which represent rectified streamlines and orderly flow after the fluid passes thru the rectifying vanes 78I'. It is a great advantage to combine the design of rectifying vanes in Fig. 16I with a narrowing of the sides of the channel, as shown in Fig. 16J, because cheap steel or die cast stampings can be used for the main vanes, without going into thick vanes construction as shown in Fig. 16B which is not only expensive but adds weight to the runner.

An alternative arrangement of flexible vanes for a runner is shown in Figures 6 and 7. The shape of the vanes 78A is illustrated in Fig. 6, left for heavy loads, and right for light loads. Notice that the entrance edge at heavy loads is curved forward. Each flexible vane 78A is provided with pivots 79A supported by a web 75A and a shroud 76A. Each vane has portions 81A and 81B projecting into openings 82A and 82B of common rings 83A and 83B, which rings are rotated by springs 84A, 84B located between portion 85A (85B) integral with the ring 83A (83B), and portion 86A of the web 75A, (and portion 86B of the shroud 76B).

In operation, when fluid pressure against the vanes 78A increases at heavy loads, the springs 84A and 84B yield and each vane deflects to a shape shown in Fig. 6, left.

In Figures 20 to 26 are shown alternative arrangements of main gates construction. In Fig. 20 the main gate comprises two parts, a stationary one 100A with a plate 100B and a shiftable part 100C. By shifting the vanes 100C, see Fig. 20 right, the flow of the working medium is throttled, and the shape of gates and consequently direction of fluid is changed. Same construction can be used for any vanes whether stationary or rotary. Other designs are illustrated in Figs. 21, 22 for form D, Figs. 23, 24 for form E and Figs. 25, 26 for form F. The same numerals are used for corresponding parts in these figures as are used in Fig. 1 but with after-script D, E or F.

Form D: the main gates 100D are pivotally supported by bolts 97D: each gate has a finger 104D projecting into a hole in a block 510 which slides in an opening 105D of a common ring 106D. By means of this ring the driver of the vehicle can unload the impeller and speed up the engine as much as desirable by changing the inclination and channel area of gates, or stop the fluid flow entirely, in the same way as shown in Fig. 1.

Form E: main gates 100E are pivotally supported by bolts 97E: each gate has an opening 105E: in this opening slides a finger 104E rigidly secured to a common ring 106E, which operated the main gates.

Form F: main gates 100F are pivotally supported by bolts 97F and bushings 97G. Each gate has a finger 104F projecting into a link 511. In the other end of the link is pivotally fastened a finger 104G which is rigidly secured in a common ring 106F.

In Figures 27 to 33 some other forms H, I, J, K, L, of synchronizing clutches are shown which can be used in connection with a turbo-converter and can be embodied in the gear box, as shown in Fig. 1, in order to synchronize runner shaft with a third shaft and to facilitate and to quicken shifting in forward and in reverse speed without the necessity of bringing the vehicle to a complete stop, and under any weather conditions. The same numerals when possible are used for corresponding parts in these figures as used in Figure 1 with after-script H to L.

Form H: Figure 27 uses two coil clutches, one for forward and the other for reverse speed. Conical coil springs 512 and 513 are attached to driving members 144H for forward and 145H for reverse. Members 144H and 145H are pressed on the main drive gear and reverse gear as shown in Figure 1. Shifting a sleeve 146H in forward brings a male member 142H, in contact with coiled spring 512. The steel coil is contracted upon the clutch drum 142H and grips it.

Form I: Figure 28 uses two single plate clutches, in which the pressure is multiplied by levers. In each clutch there are two driving discs 144I and 514 for forward and 145I and 515 for reverse. The axially slidable driving disc 514 is driven by the member 144I by means of a spline 520. A similar spline is provided on the reverse member 145I, see numeral 521. The member 144I carries a series of levers 516 pivotally supported at 522: each lever has an adjustable bolt 518 pressing against the disc 514 and its long arm extends radially inward and can be pressed against by the sliding sleeve 146I, see position "A" of the lever in dotted lines. For reverse a series of levers 517 pivotally supported at 523 is provided; these levers carry bolts 519.

Form J, illustrated in Fig. 29, is similar in construction and operation to the synchronizing mechanism described in Fig. 1, the chief difference being that instead of two conical clutches, two coil clutches are used. When the sliding cone 142J is forced in contact with the conical coil spring 524 the steel coil is contracted upon the conical clutch drum 142J and grips it. For reverse speed a conical coil spring 525 is secured to the driving member 145J.

Form K, represented by Figs. 30 and 31. In this construction the clutch driving members 144K and 145K are equipped with springs 530 and 531 fastened to the driving members by rivets 532. Engaging with the springs are corresponding clutch driven members 142K and 143K which are integral with shifting head 146K. The head can be operated by a shift fork (not shown) in a conventional way. Shifting the head axially in position R, shown in dotted lines in Fig. 31, causes engagement of the member 143K with the spring 531 and resulting frictional resistance synchronizes the third shaft 112K with reverse gear 132K (not shown in Fig. 31 but shown in Fig. L): moving further backwards the inner member 143K disengages spring 531 but in the next moment teeth 152K engage teeth 154K connecting the third shaft with the reverse gear positively. Shifting in forward, of course, is similar: first the member 142K engages spring 530 and synchronizes the third shaft with the runner shaft, then teeth 151K engage teeth 153K for direct drive.

Form L illustrated in Figs. 32 and 33. The function of this mechanism is similar to the function of the form K, the difference being that forward drive is equipped with a free-wheeling clutch. When shifting sliding head 142L backwards, the teeth of the reverse gear 132L engage a spring 533 and synchronize the third shaft 112L with the reverse gear, the teeth 152L of the member 143L then engage the reverse gear teeth, locking the third shaft to the reverse gear. Shifting in forward is similar, the first teeth of the main drive gear 93L engage a spring 532 and by frictional resistance synchronize the third shaft and the runner shaft, then the main gear teeth enter the teeth 153L for direct drive. The jaws 153L are not rigidly connected to the sliding head 146L, but are fastened to the same by means of a one-way clutch. Fig. 33 is an end view of the free-wheel unit for forward drive, which consists of a four lobed outer cam 534 associated with the jaws 153L, an inner ring 535 splined to the third shaft, and four balls 536. The cam curve is a true arc, the wedging angle being about 5 deg. When the teeth 153L engage with the main gear teeth, the driving torque is transmitted through the overrunning clutch to the inner ring, with resultant free-wheel operation. Whenever the operator makes further axial movement of the sliding head 146L the movement will bring the inner ring jaws 537 in positive engagement with corresponding jaws 538 of the main drive gear 93L. In this way the third shaft can be positively locked with the main gear, and the action of the overrunning clutch can be eliminated, at will, while in operation.

The device not only synchronizes the third shaft with the forward or reverse gear but also reduces the inertia of the shifted parts to minimum at the moment of engagement, and not only enables the engine to drive the car, but prevents the engine from being driven by the momentum of the car, thus permitting the car to coast or free-wheel.

In Figures 39 and 40 is shown an alternative design of one-way clutch between the primary and secondary shafts. The same numerals, when possible, are used for corresponding parts in these figures as in Fig. 1, with the after-script M. Fig. 39 is an end sectional view of the one way clutch, which consists of a two lobed inner cam 540 splined to the runner shaft 87M, an outer ring 541 integral with the driving shaft 57M, and two balls 542. The overrunning clutch enables the engine to be driven by the momentum of the car, prevents the car from coasting and enables the engine to be used as a brake on long and steep hills, or whenever the driver of the car desires such operation.

When, however, free-wheeling is required, this one way clutch can be put out of action, to prevent the engine from being driven by the momentum of the car and to permit the car to coast or free-wheel. The clutch operating mechanism comprises a double crank 543 pressed on a shaft 544 associated with a sleeve 545, which in turn is connected to a disc 546. The sleeve is provided with a helical groove 547, and the main drive gear 93M is equipped with a corresponding pin 548 engaging said groove. When a member 142M of the shifting unit is moved axially forward it pushes the disc 546 and the sleeve forward through the helical groove 547 and pin 548 rigidly secured in the gear 93M, the sleeve, the shaft and the crank 543 must revolve from position A to position B, see Fig. 39. Any pressure of the crank against the balls 542 is prevented, the crank being in position B, and without initial pressure any wedging action of the balls cannot start and consequently no torque can be transmitted by means of the one way clutch which is therefore inoperative, and the car can coast or free-wheel. Small backwards movement of the member 142M releases a spring 549 which pushes the disc 546 and turns the crank to position A. The pressure on balls 545 creates a weighing action of the one way clutch, and the coasting or free-wheeling of the car is prevented, and the engine can be used as a brake.

Principally the mechanism of Figs. 39 and 40 represents a turbo-power transmission having a one way clutch between the impeller and the runner and means to make said clutch, operative or inoperative, at will, during operation.

In the same space formed between the cam 540 and the ring 541 are another set of balls 542A adapted to lock the ring 541 to the cam 540 positively for "direct drive." This can be accomplished by moving the crank 543 to the position "C", and producing pressure on balls 542A, which pressure creates a wedging action and consequently the torque can be transmitted directly from the primary shaft 57M to the secondary shaft 87M, for the shafts become locked together. This action is of advantage on long trips, because the fluid circulation ceases and all the hydraulic losses are eliminated.

Referring to the runner discharge angle C (see Figs. 16 and 36) it may be pointed out that this angle was selected smaller than 90 deg. (forward). This in order to get the fluid circulation with a forward circumferential component at any speed of the runner, even at stand still. The advantage being to diminish variations in fluid discharge angles at various speeds of the runner, to decrease curvature of the runner vanes and to increase the efficiency of the device as well as to facilitate manufacturing of the vanes.

Features disclosed but not claimed herein are being claimed in my copending applications Serial No. 331,199, filed April 23, 1940; Serial No. 333,360, filed May 4, 1940; Serial No. 337,036, filed May 24, 1940, and Serial No. 337,037, filed May 24, 1940.

While the invention has been described with particular reference to several desirable embodiments, it is not intended to limit the scope of the invention to the particular features illustrated and described, nor otherwise than by the terms of the following claims.

What I claim is:

1. A fluid power transmission comprising a passage for circulating fluid, driving vanes, driven vanes and auxiliary guide vanes, the passage being formed by the driving, driven and the guide vanes, said vanes having auxiliary fluid directing blades, said blades being positioned at the entrance of the vanes and spaced so as to rectify the fluid flow at the entrance of the vanes and having a ratio $h/p$ greater than .5 to guide the fluid flow parallel with the vanes to prevent turbulence between the vanes, where "$h$" represents the height of the blades in the direction of flow and "$p$" equals the pitch of blades.

2. In a fluid power transmission, a casing, fluid in the casing, a plurality of sets of vane wheels in said casing, a fluid channel formed by said vane wheels, said vanes having auxiliary blades in front of the inlet into the vanes, said auxiliary blades located so as to force the fluid to follow the backs of the said vanes and having an $h/p$ ratio greater than .5 to make the streamlines of the flow parallel with the vanes at the entrance into said vanes, where "$p$" is the pitch of the blades and "$h$" is the height of the blades.

3. A fluid power transmission comprising a casing, fluid in the casing, driving and driven vane wheels in said casing, a fluid channel formed by said vane wheels, said vanes having more than twice the number of guidance channels in the entrance portion than in the remaining portions of said vanes length of the entrance channels being substantially equal to .5 of their width.

4. A fluid power transmission comprising a passage for fluid, driving, driven and guiding rotatable vane wheels, the passage being formed by said wheels, movable vanes on one of said vane wheels, means to couple and uncouple two of the vane wheels, a mechanism actuating the coupling means automatically under the control of said movable vanes, said mechanism being connected to said movable vanes, the movable vanes being pivotally mounted to the guide wheel.

5. A fluid power transmission comprising a housing, a passage for circulating fluid, a driving wheel, a driven wheel and a rotatable guide wheel having movable vanes in the housing, the passage formed by the driving, driven and guide wheels, means to couple the guide wheel to the housing automatically under the control of said movable vanes, the movable vanes having a limited amount of movement relative to the guide wheel.

6. A fluid power transmission comprising a passage for circulating fluid, a driving wheel, a driven wheel and a rotatable guide wheel, the passage being formed by said wheels, means to couple the guide wheel to the driving wheel automatically under the control of the speed of the guide wheel.

7. A fluid power transmission comprising a passage for circulating fluid, driving, driven and rotatable guide vanes, the passage being formed by said vanes, a mechanism to couple the guide vanes to the driving vanes automatically at certain predetermined operative speeds of the guide wheel.

8. A fluid power transmission comprising a passage for circulating fluid, driving vanes, driven vanes and rotatable guide vanes, the passage being formed by said vanes, means to hold the guide vanes stationary at low speed of the driven vanes and to permit them to rotate at higher speed and to energize the fluid at still higher speeds automatically under the control of the rotary speed of the guide vanes.

JOSEPH JANDASEK.